(12) United States Patent
Yamaguchi et al.

(10) Patent No.: US 7,782,211 B2
(45) Date of Patent: Aug. 24, 2010

(54) RFID LABEL WITH INCREASED READABILITY OF PRINTED IMAGES

(75) Inventors: Koshiro Yamaguchi, Kakamigahara (JP); Kazunari Taki, Nagoya (JP); Akira Ito, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 502 days.

(21) Appl. No.: 11/725,332

(22) Filed: Mar. 19, 2007

(65) Prior Publication Data

US 2007/0222615 A1    Sep. 27, 2007

(30) Foreign Application Priority Data

Mar. 24, 2006  (JP) ............................ P2006-082482
Mar. 24, 2006  (JP) ............................ P2006-084213

(51) Int. Cl.
*G08B 13/14*    (2006.01)

(52) U.S. Cl. ............... 340/572.7; 340/572.4; 340/572.8; 340/568.1; 343/872; 343/873; 156/264; 156/299; 156/302

(58) Field of Classification Search ............. 340/572.7, 340/572.4, 572.8, 568.1; 343/872, 873; 156/264, 156/299, 302
See application file for complete search history.

(56) References Cited

U.S. PATENT DOCUMENTS

| 6,121,880 | A  | * | 9/2000  | Scott et al. ............... 340/572.5 |
| 6,147,662 | A  | * | 11/2000 | Grabau et al. ............... 343/895 |
| 6,836,215 | B1 |   | 12/2004 | Laurash et al. |
| 6,951,596 | B2 | * | 10/2005 | Green et al. ................ 156/264 |
| 2004/0118930 | A1 | | 6/2004 | Berardi et al. |
| 2005/0091821 | A1 | | 5/2005 | Best et al. |

FOREIGN PATENT DOCUMENTS

| EP | 1 018 703  | 7/2000 |
| EP | 1 626 362  | 2/2006 |
| JP | 2004333651 | 11/2004 |

* cited by examiner

*Primary Examiner*—Tai T Nguyen
(74) *Attorney, Agent, or Firm*—Day Pitney LLP

(57) ABSTRACT

A RFID label has a multilayer structure including a sheet-like antenna base material, a RFID circuit element embedded in the antenna base material, a cover film having a printing region in which prescribed printing is performed, an adhesive layer for that bonds the antenna base material to the cover film, an adhesive layer for fixing the antenna base materials to a desired object, and a release layer for covering the adhesive layer. The length of the antenna base material in the longitudinal direction of the RFID label is no less than the length of the printing region.

5 Claims, 31 Drawing Sheets

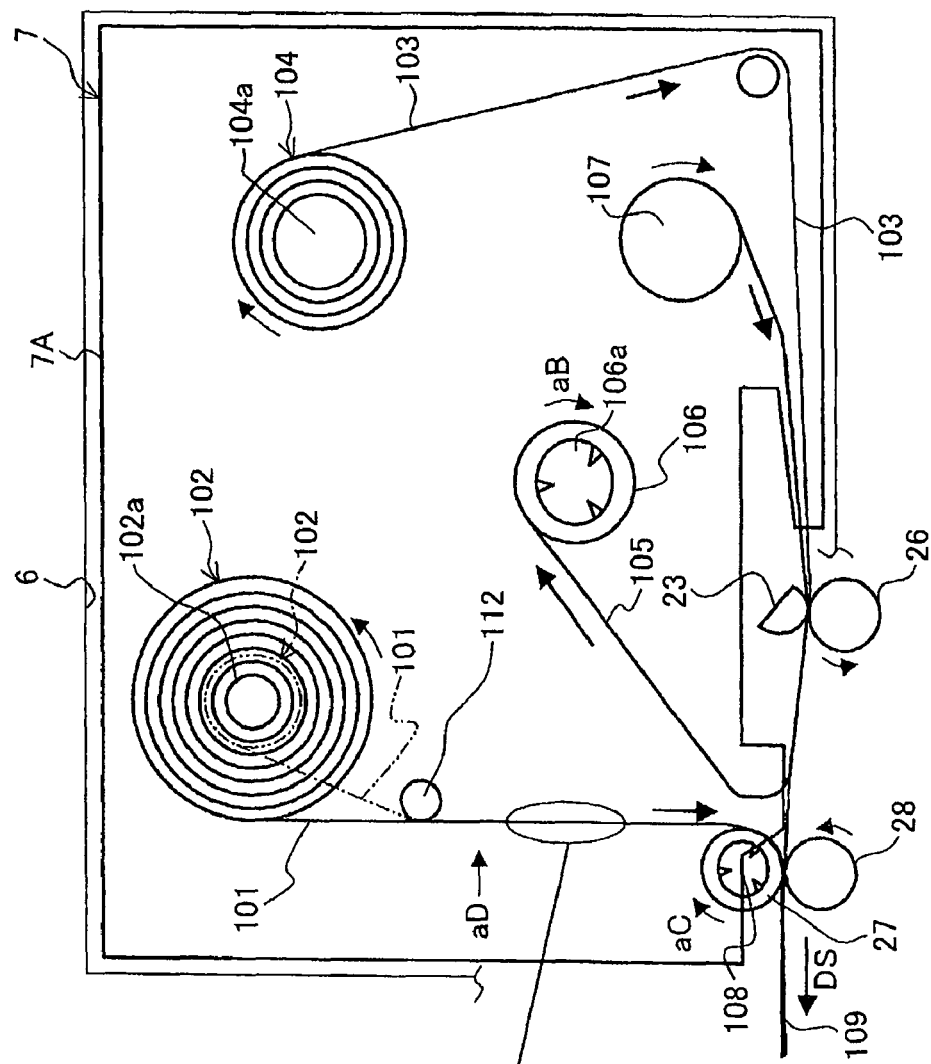
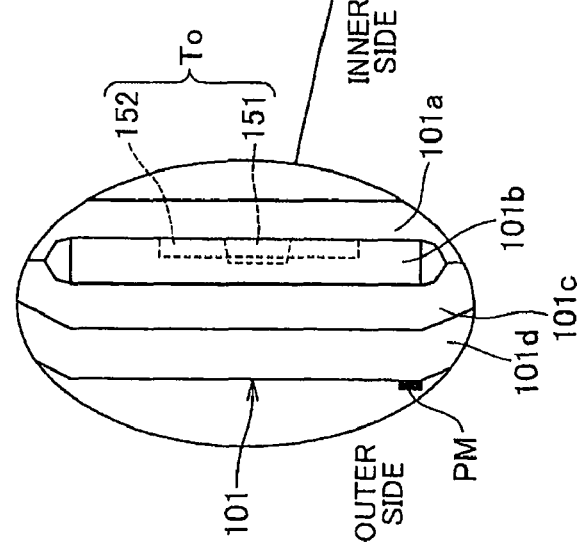

FIG.18(a)
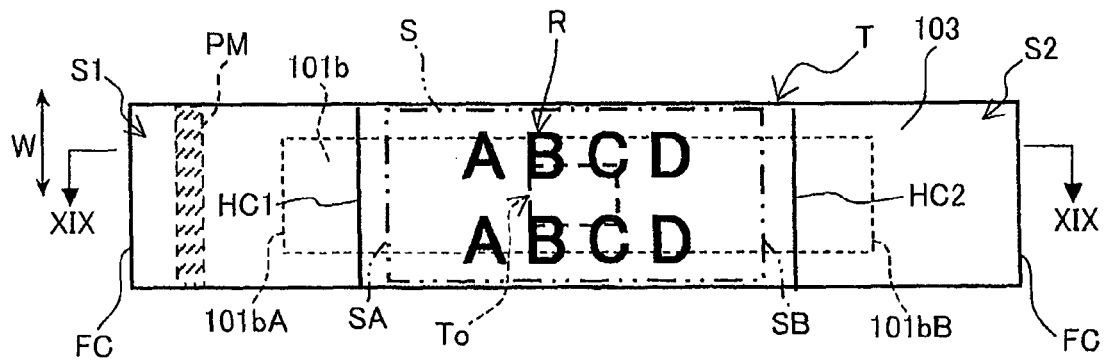
FIG.18(b)
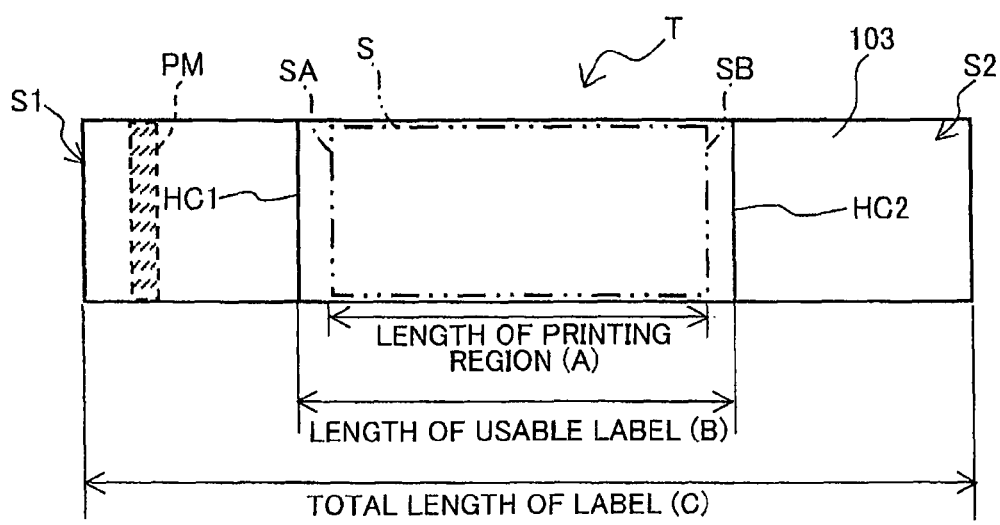
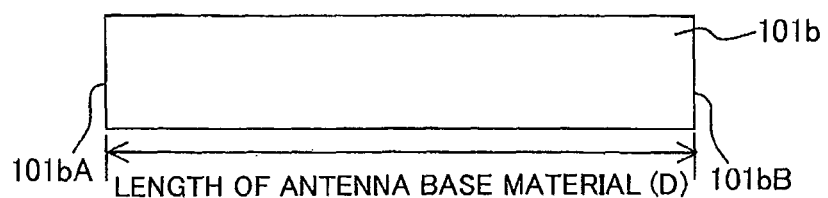
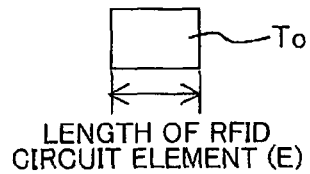

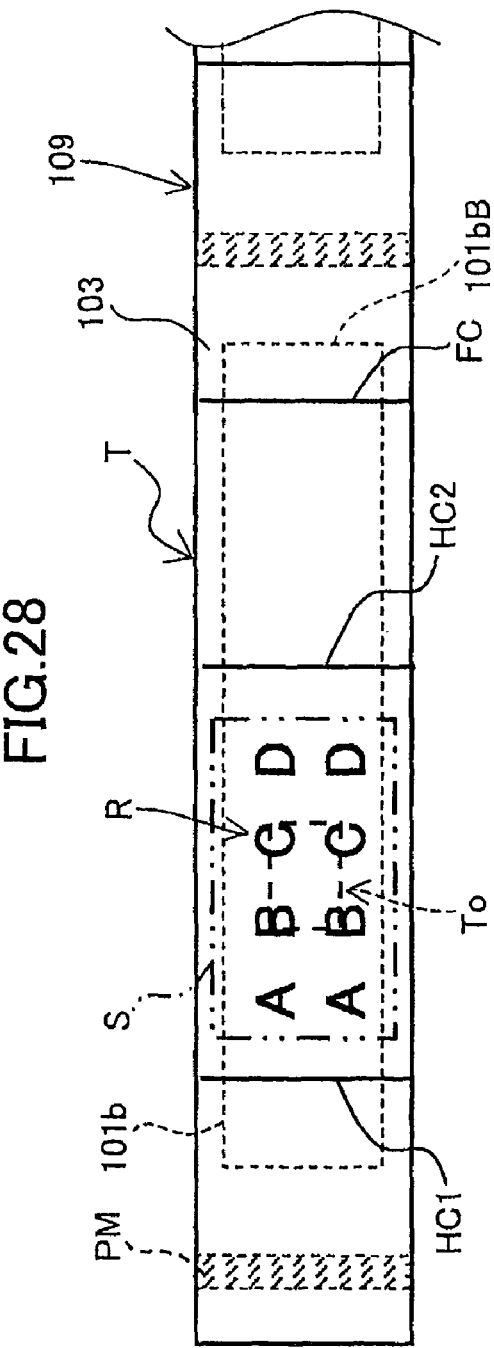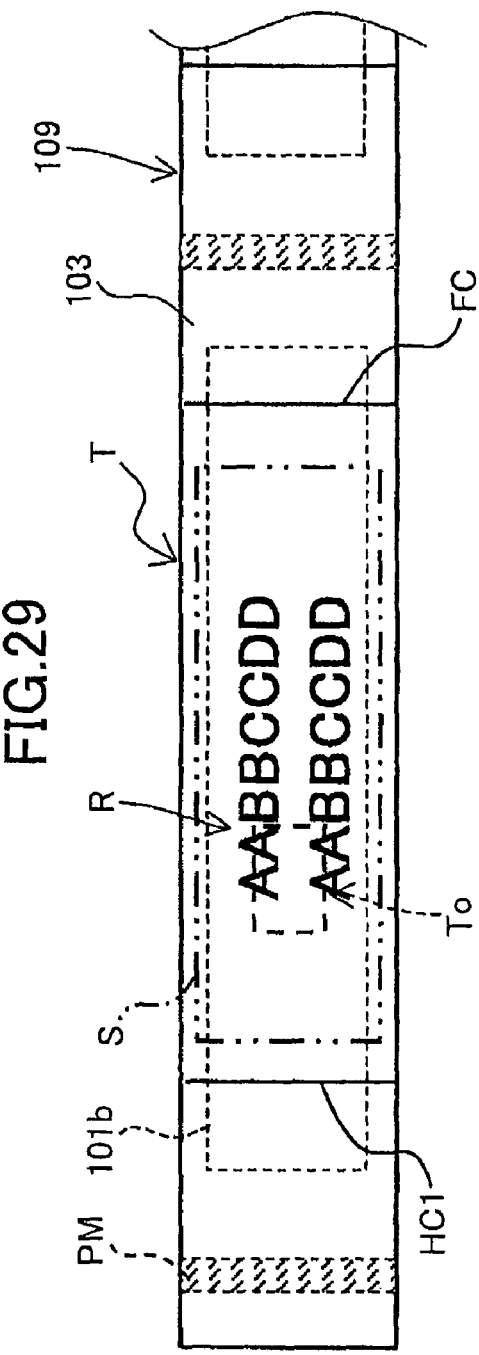

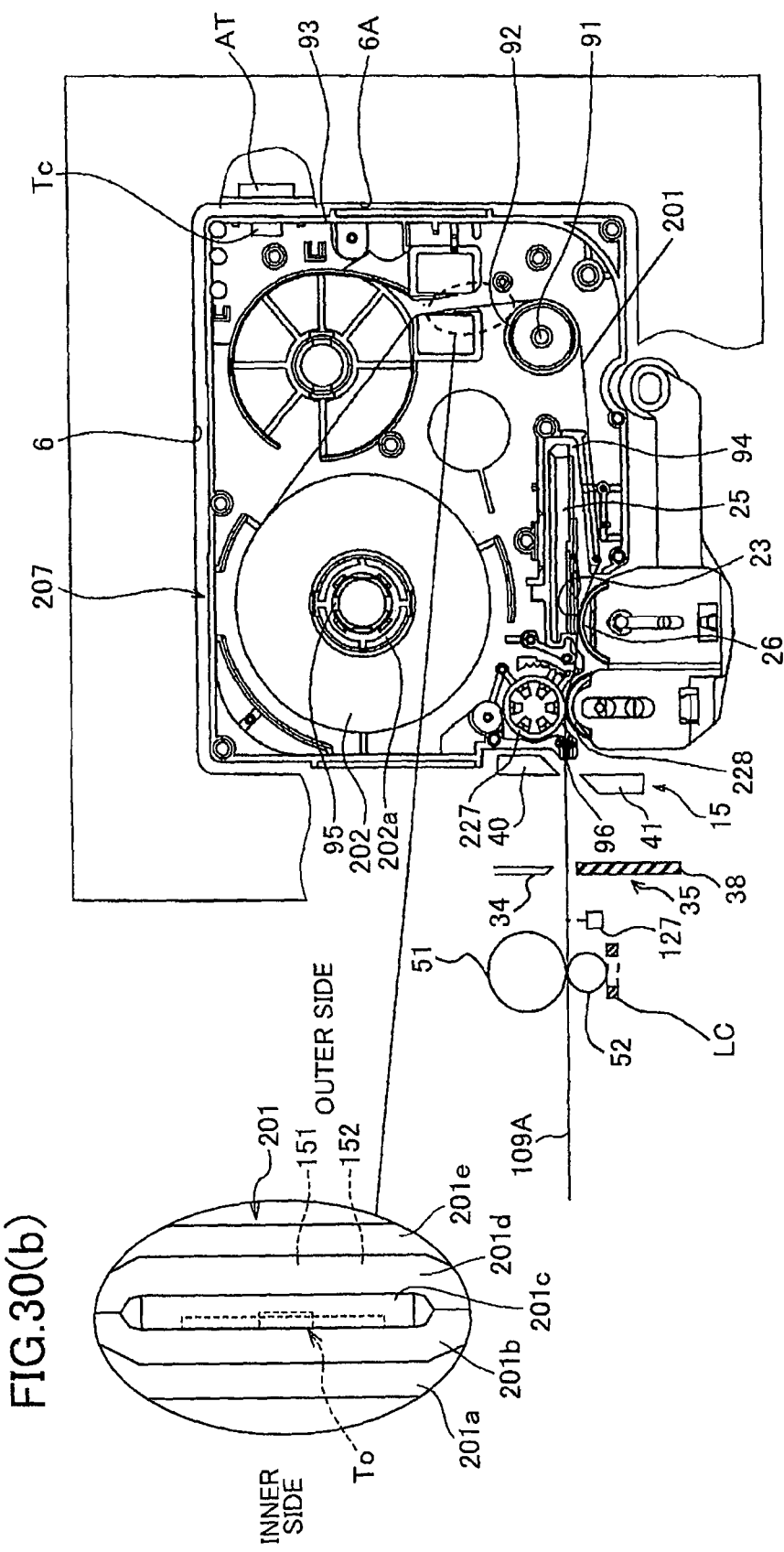

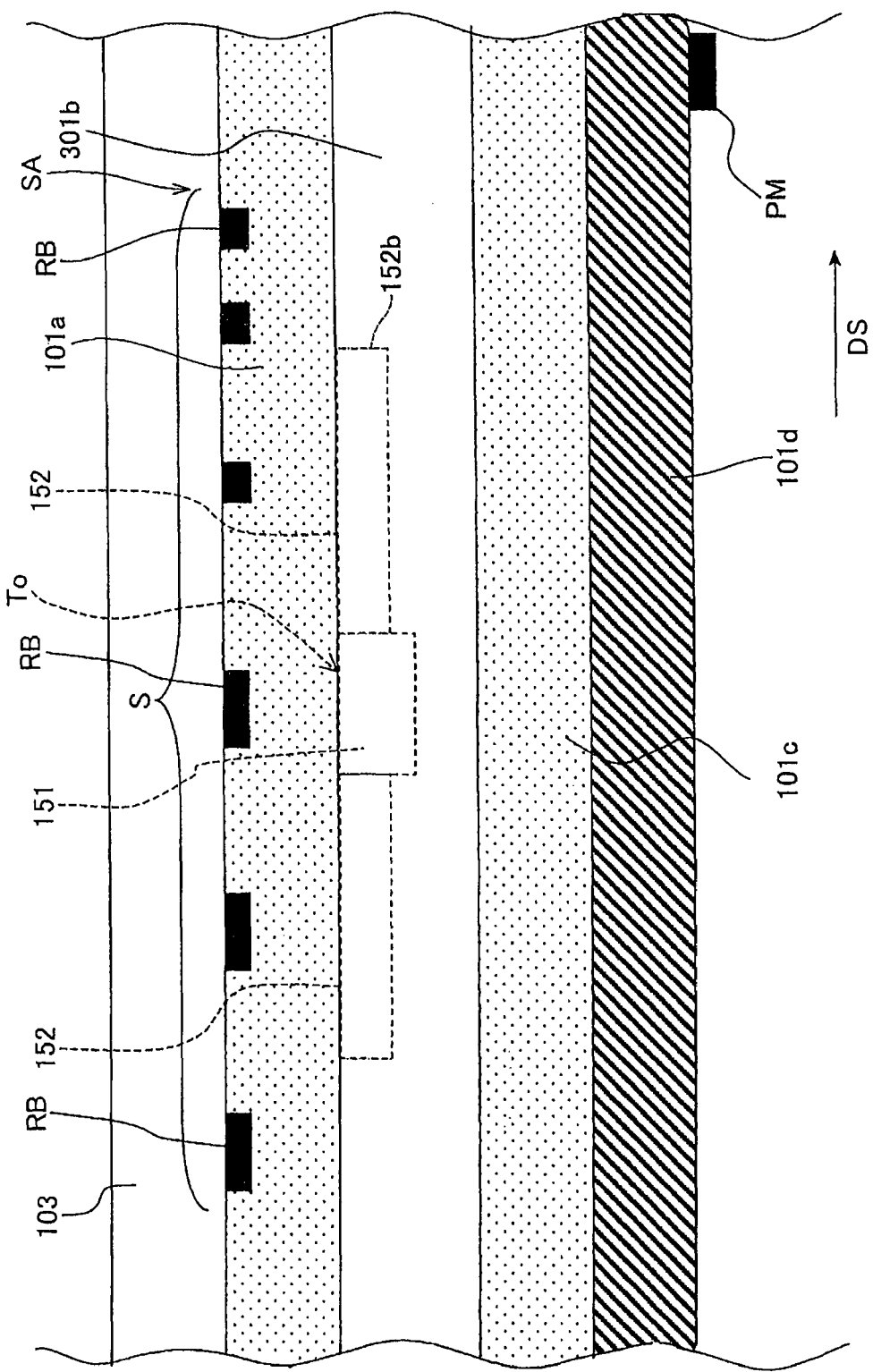

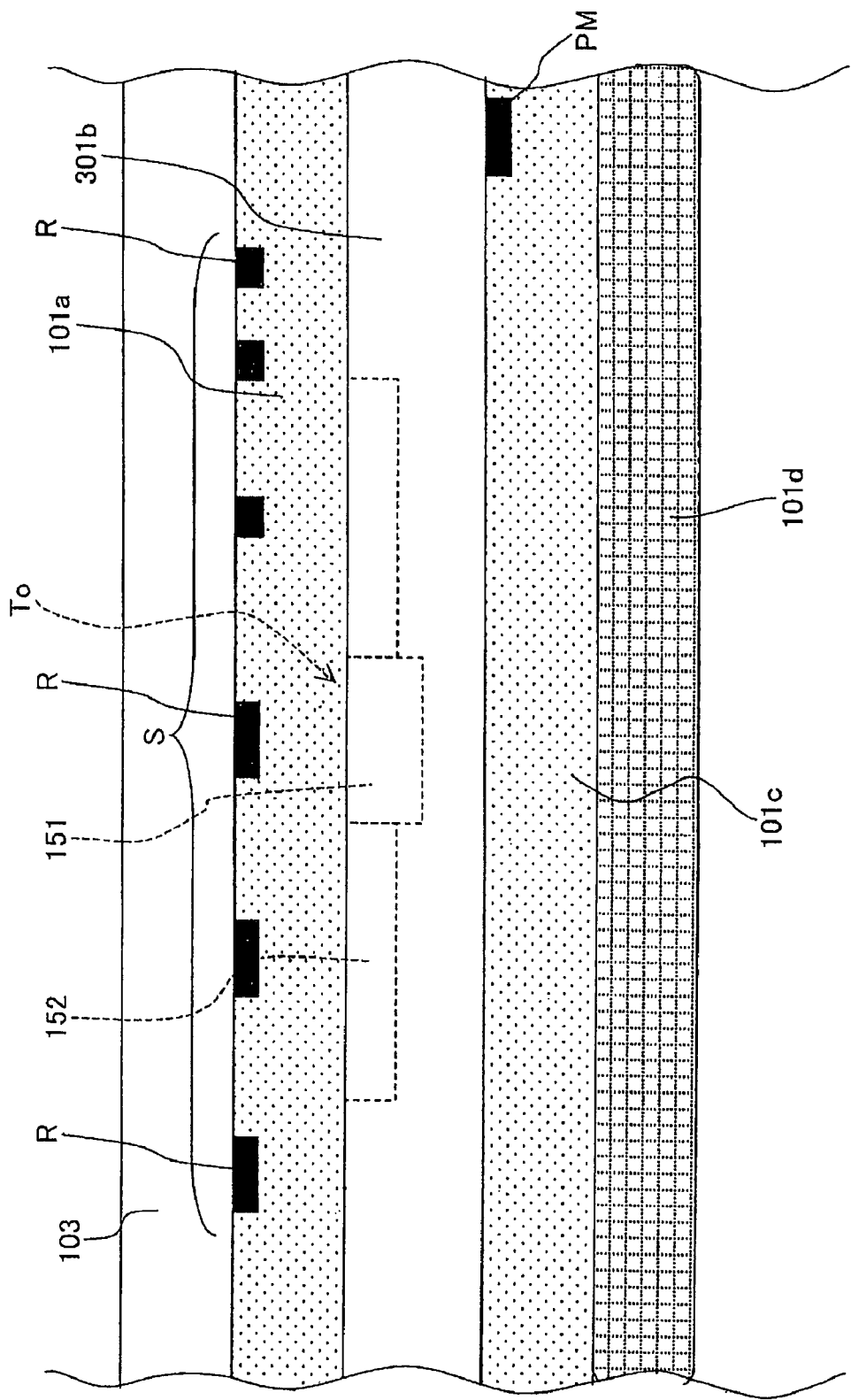

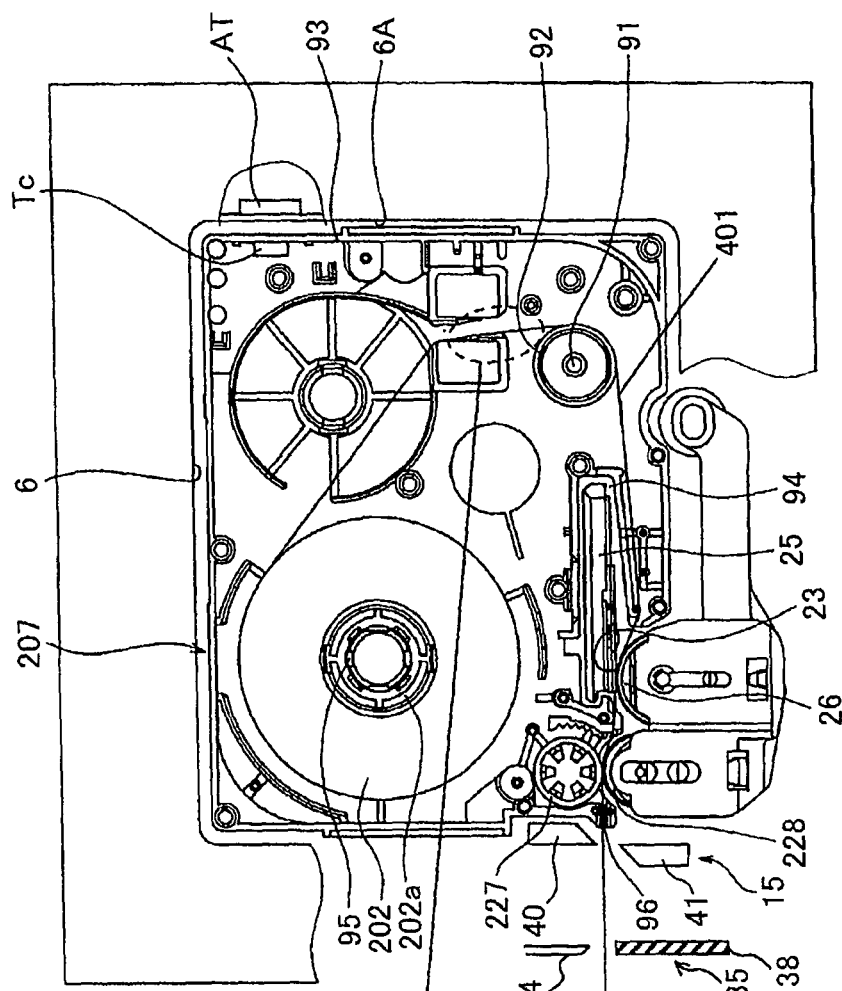
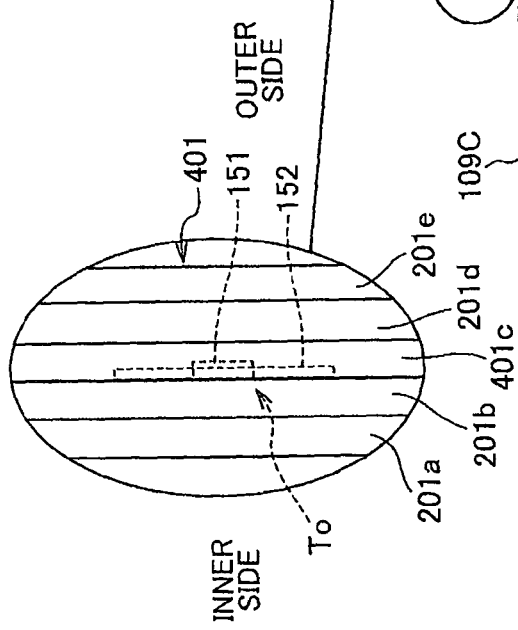
FIG.41(a)
FIG.41(b)

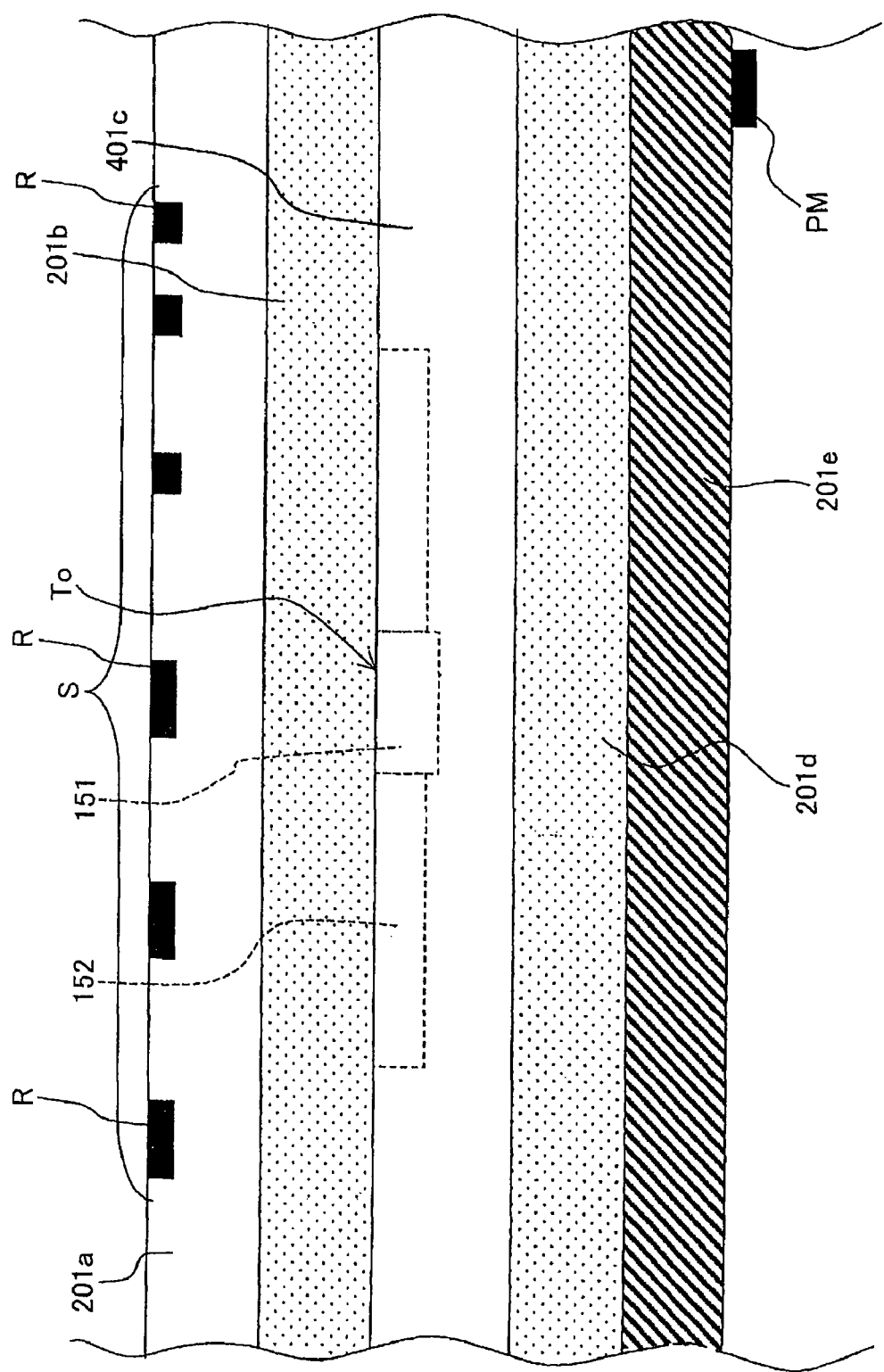

RFID LABEL WITH INCREASED READABILITY OF PRINTED IMAGES

CROSS REFERENCE TO RELATED APPLICATIONS

This application claims priority from Japanese Patent Application Nos. 2006-082482 and 2006-084213 both filed Mar. 24, 2006. The entire content of each of these priority applications is incorporated herein by reference.

TECHNICAL FIELD

The disclosure relates to a RFID label having a RFID circuit element; a tag-tape roll including RFID circuit elements; a cartridge including such a tag-tape roll; and a tag label maker for producing a RFID label.

BACKGROUND

RFID (radio frequency identification) systems are well known in the art as a technology for exchanging data with a RFID circuit element capable of storing data through a non-contact method (an electromagnetic coupling method using a coil, an electromagnetic induction method, or a radio wave method, for example).

A tag label maker that creates a RFID label (tag label) including a RFID circuit element is disclosed in US2006/0118229, for example. This tag label maker uses a tag tape (strip-like tape) having RFID circuit elements arranged at regular intervals in the longitudinal direction of the tag tape. The tag tape is wound about a supply spool and has multiple layers including, in order along the radial direction of the supply spool beginning from the outer side, a bonding adhesive layer, a base layer, an affixing adhesive layer, and a release layer. The RFID circuit elements are provided between the base layer and the affixing adhesive layer.

In this tag label maker, tag labels are produced in the following manner. That is, the tag tape is fed from the supply spool and bonded via the bonding adhesive layer to a printable tape layer (laminate tape) after printing a desired image on the printable tape layer. In this manner, a printed label tape is formed. Then, RFID data is written to the RFID circuit elements provided on the printed label tape. By cutting the printed label tape to desired lengths, tag labels with printed images are generated continuously. The tag labels produced in this way are used by peeling the release layer to expose the affixing adhesive layer and fixing the tag label through this adhesive to an object.

In the conventional tag tape configured as described above, the RFID circuit elements exist discontinuously (intermittently) while the printable tape layer, the bonding adhesive layer, and the like are provided continuously in a tape-shape along the longitudinal direction of the tag tape. In other words, the tag tape has areas where the FRID circuit elements exist and areas where the FRID circuit element does not exist. Consequently, the tag tape has an uneven thickness in the laminated direction, marking borders near the edges of the RFID circuit elements. This unevenness can produce wrinkles in the tag tape that can distort the images printed on the printable tape layer, reducing the readability of the printed images.

SUMMARY

In view of the foregoing, it is an object of the disclosure to provide a RFID label capable of preventing a reduction in the readability of printed images caused by wrinkles; and a tag-tape roll, a RFID circuit element cartridge, and a tag-label maker for producing the RFID label.

In order to attain the above and other objects, the disclosure provides a RFID label including an antenna base material having a sheet-like shape with a tape side, a printable tape layer having a printing region in which a prescribed image is printed, and a bonding adhesive layer that bonds the printable tape layer to the tape side of the antenna base material. The antenna base material has a RFID circuit element that includes an IC chip and an antenna. A length of the antenna base material is equal to or greater than a length of the printing region with respect to a first direction.

There is also provided a RFID label that is formed by cutting a tag tape along a prescribed cutting plane along a first direction. The tape has a plurality of sheet-like antenna base materials arranged at prescribed intervals in a second direction substantially orthogonal to the first direction. The RFID label includes an antenna base material having a RFID circuit element that includes an IC chip and an antenna, a printable tape layer having a printing region in which a prescribed image is printed, and a bonding adhesive layer that bonds the antenna base material to the printable tape layer. A length of the antenna base material is equal to or greater than a length of the printing region with respect to the second direction.

There is also provided a tag tape roll including a shaft extending in a first direction and a tag tape wound about the shaft. The tag tape extends in a second direction substantially orthogonal to the first direction and includes a plurality of sheet-like antenna base materials arranged at prescribed intervals along the second direction, an affixing adhesive layer that is disposed on the antenna base materials and that enables to fix each of the antenna base materials to an object, a release layer that covers the affixing adhesive layer and that is peeled off when fixing any of the antenna base materials to the object, and a bonding adhesive layer that enables the antenna base materials to be bonded to a printable tape layer having a plurality of printing regions in correspondence with the RFID circuit elements. Each antenna base material has a RFID circuit element that includes an IC chip and an antenna. An image is to be printed within each of the printing regions. A length of each antenna base material is equal to or grater than a length of a corresponding printing region with respect to the second direction.

There is also provided a RFID circuit element cartridge that is detachably mountable on a tag label maker. The RFID circuit element cartridge includes a tag tape roll that includes a roll of tag tape. The tag tape has a plurality of sheet-like antenna base materials arranged at prescribed intervals along a longitudinal direction of the tag tape, an affixing adhesive layer that is disposed on the antenna base materials and that enables to fix each of the antenna base materials to an object, a release layer that covers the affixing adhesive layer and that is peeled off when fixing any of the antenna base materials to the object, and a bonding adhesive layer that enables the antenna base materials to be bonded to a printable tape layer having a plurality of printing regions in correspondence with the RFID circuit elements. Each antenna base material has a RFID circuit element that includes an IC chip and an antenna. An image is to be printed within each of the printing regions. A length of each antenna base material is equal to or grater than a length of a corresponding printing region with respect to the longitudinal direction of the tag tape.

There is also provided a tag label maker including a conveying unit, a transmitting/receiving unit, a printing unit, and a first control unit. The conveying unit conveys a tag tape in a predetermined direction. The tag tape includes: a plurality of sheet-like antenna base materials arranged at prescribed intervals along the predetermined direction, each antenna base material having a RFID circuit element that includes an IC chip and an antenna; an affixing adhesive layer that is disposed on the antenna base materials and that enables to fix each of the antenna base materials to an object; a release layer that covers the affixing adhesive layer and that is peeled off when fixing any of the antenna base materials to the object; a printable tape layer; and a bonding adhesive layer that bonds the antenna base materials to the printable tape layer. The transmitting/receiving unit exchanges data wirelessly with each of the RFID circuit elements. The printing unit prints an image corresponding to one of the RFID circuit element, within a printing region on the printable tape layer. The first control unit controls the size of the printing region according to the layout of the antenna base materials.

There is also provided a RFID label including an antenna base material layer having a tape shape of substantially uniform thickness, a RFID circuit element being embedded in a tape-side surface of the antenna base material layer, an affixing adhesive layer that is disposed on the antenna base material layer and that enables to fix the antenna base material layer to an object, a release layer that covers the affixing adhesive layer and that is peeled off when fixing the antenna base material layer to the object, a printable tape layer on which an image is printed, and a bonding adhesive layer that bonds an antenna-side surface of the printable tape layer to the tape-side surface of the antenna base material layer. The RFID circuit element has an IC chip and an antenna.

There is also provided a tag tape roll including a shaft extending in a first direction and a tag tape wound around the shaft. The tag tape has a length in a second direction substantially orthogonal to the first direction. The tag tape includes an antenna base material layer having a tape shape of substantially uniform thickness, a plurality of RFID circuit elements embedded in a first surface of the antenna base material layer, an affixing adhesive layer that is disposed on the antenna base material layer and that enables to fix the antenna base material layer to an object, and a release layer that covers the affixing adhesive layer and that is peeled off when fixing the antenna base material layer to the object. Each of the RFID circuit elements has an IC chip and an antenna.

There is also provided a RFID circuit element cartridge detachably mountable on a tag label maker. The RFID circuit element cartridge includes a tag tape roll including a roll of tag tape. The tag tape has an antenna base material layer having a tape shape of substantially uniform thickness and having a tape-side surface, a plurality of RFID circuit elements embedded in the tape-side surface of the antenna base material layer, an affixing adhesive layer that is disposed on the antenna base material layer and that enables to fix the antenna base material layer to an object, and a release layer that covers the affixing adhesive layer and that is peeled off when fixing the antenna base material layer to the object. Each RFID circuit element has an IC chip and an antenna.

BRIEF DESCRIPTION OF THE DRAWINGS

Illustrative aspects in accordance with the disclosure will be described in detail with reference to the following figures wherein:

FIG. 5(a) is an enlarged plan view conceptually showing a detailed structure of a cartridge mounted in the label maker;

FIG. 5(b) is an enlarged cross-sectional view of a base tape provided in the cartridge;

FIG. 18(a) is a plan view of a RFID label in partial phantom formed by the label maker;

FIG. 18(b) is an explanatory diagram showing the dimensions of the RFID label in FIG. 18(a);

FIG. 28 is a plan view in partial phantom showing a RFID label according to a fourth modification of the first embodiment in which a full cut is made through the antenna base material;

FIG. 29 is a plan view in partial phantom showing another RFID label according to the fourth modification of the first embodiment in which a full cut is made through the antenna base material;

FIG. 30(a) is a plan view showing the detailed structure of a cartridge according to a second embodiment of the disclosure;

FIG. 30(b) is an enlarged partial cross-sectional view of a base tape provided in the cartridge of FIG. 30(a);

FIG. 32(a) is a plan view showing the detailed structure of a cartridge according to a third embodiment of the disclosure;

FIG. 32(b) is an enlarged partial cross-sectional view of a base tape provided in the cartridge of FIG. 32(a);

FIG. 36 is a vertical cross-sectional view showing the layered structure of the RFID label according to the third embodiment of the disclosure;

FIG. 40 is a vertical cross-sectional view showing the structure of a RFID label according to a fourth modification of the third embodiment in which the position of the sensor mark is changed;

FIG. 41(a) is a plan view showing a detailed structure of a cartridge according to a fourth embodiment of the disclosure;

FIG. 41(b) is an enlarged cross-sectional partial view of a base material provided in the cartridge of FIG. 41(a); and FIG. 42 is a vertical cross-sectional view showing the structure of a RFID label according to the fourth embodiment of the disclosure.

DETAILED DESCRIPTION

Figure 1:
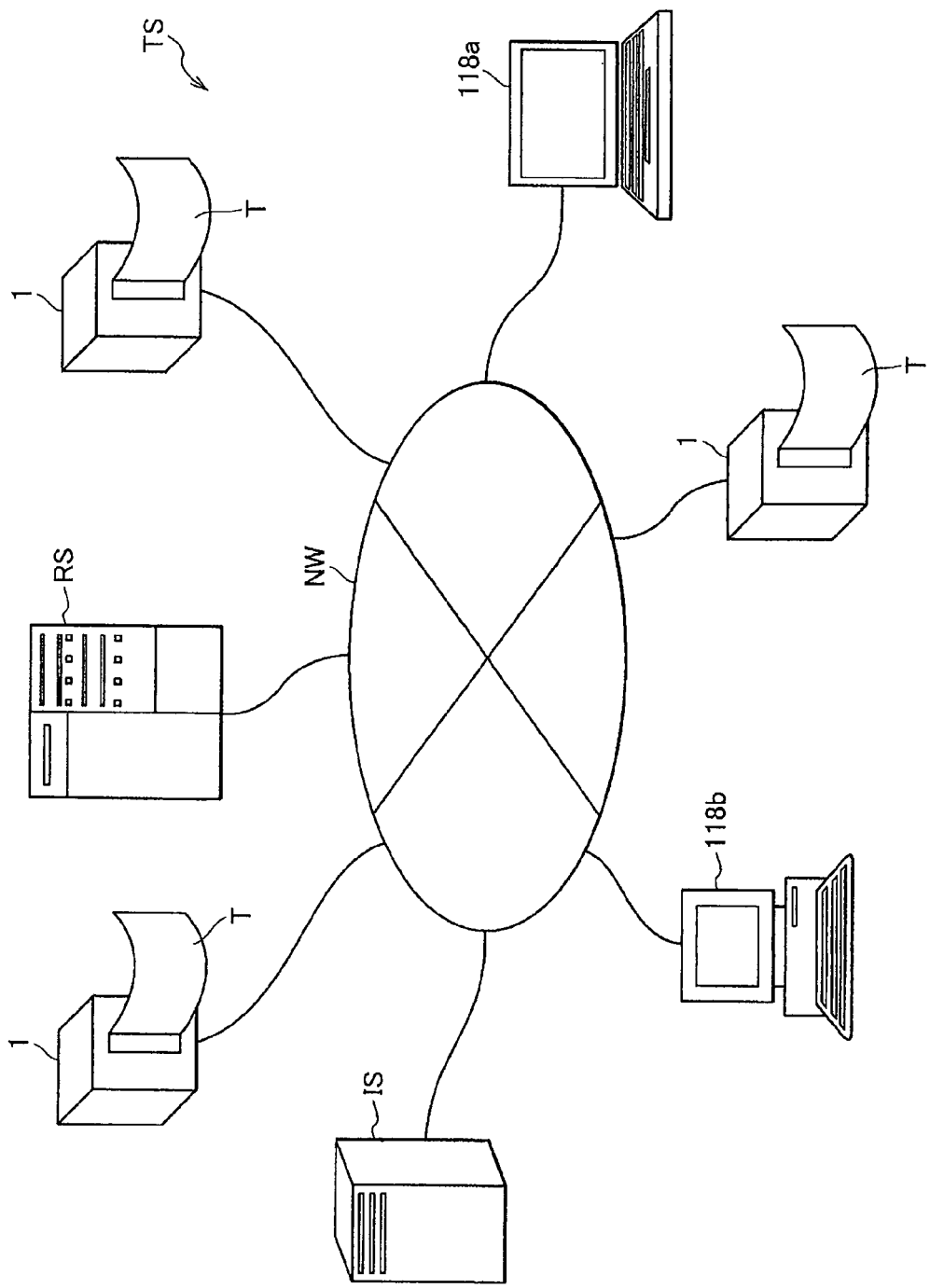
FIG. 1 is a schematic diagram showing a RFID-label making system that includes a label maker according to a first embodiment of the disclosure.

A RFID-label making system for producing RFID labels according to embodiments of the disclosure will be described while referring to the accompanying drawings wherein like parts and components are designated by the same reference numerals to avoid duplicating description.

First Embodiment

First, a first embodiment of the disclosure will be described with reference to FIGS. 1 to 24.

FIG. 1 is a schematic diagram showing a RFID-label making system TS according to the first embodiment of the disclosure.

In the RFID-label making system TS shown in FIG. 1, a plurality of label makers 1 are connected to a root server RS, a data server IS, a terminal 118a, and a common computer 118b via a wired or wireless network NW. In the following description, the terminal 118a and the computer 118b will be collectively referred to as PCs 118.

Each label maker 1 produces RFID labels T based on operations performed on one of the PCs 118.

Figure 2:
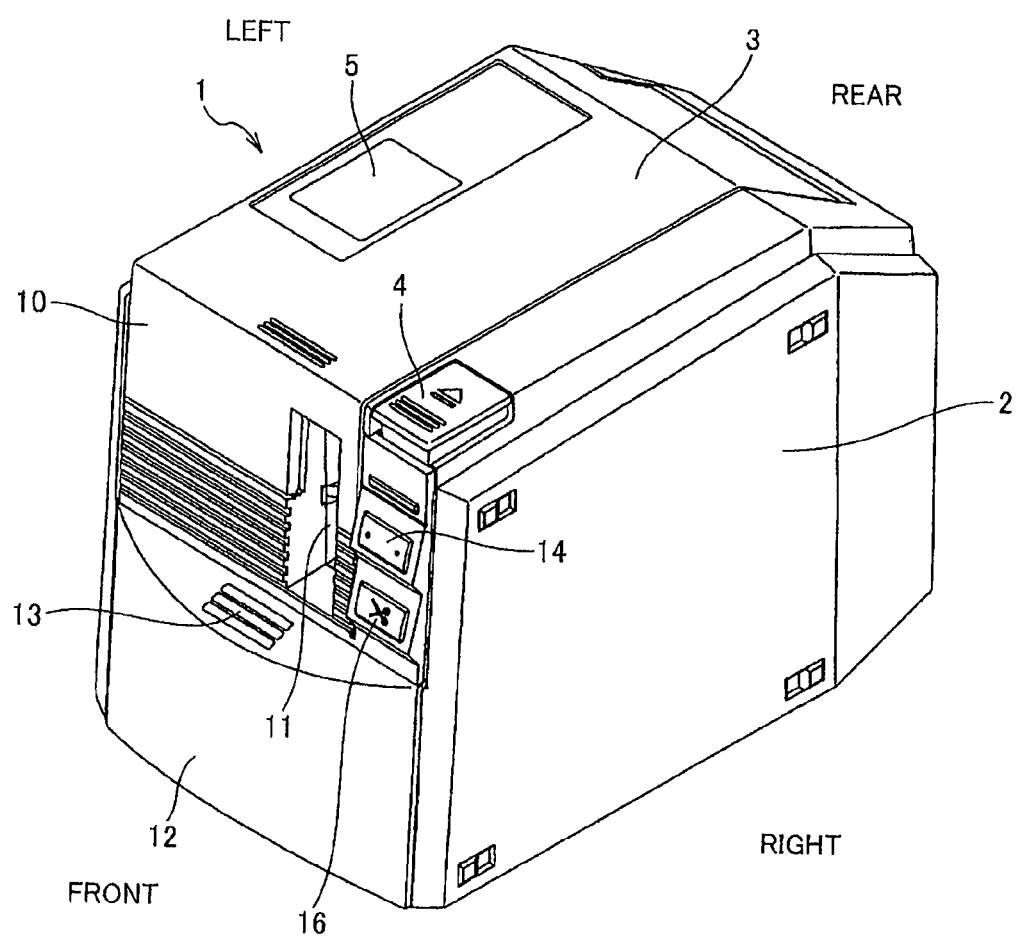
FIG. 2 is a perspective view showing the overall structure of the label maker.

FIG. 2 is a perspective view showing the overall structure of one of the label makers 1. Note that in the following description, the expressions "front", "rear", "left", "right", "above", and "below" are used to define the various parts when the label maker 1 is disposed in an orientation in which it is intended to be used.

As shown in FIG. 2, the label maker 1 includes a device body 2 and a cover 3 capable of opening and closing on the top surface of the device body 2.

Provided on the front side of the device body 2 are a front wall 10 and a front cover 12. The front wall 10 is formed with a label outlet 11. A power button 14 for switching power to the label maker 1 ON and OFF is provided on the front wall 10. A cut button 16 is disposed below the power button 14. The front cover 12 is provided below the front wall 10 and is pivotably supported about its lower edge. The front cover 12 includes a pressing part 13 and is configured to open forward when an operator pushes down on the pressing part 13.

The cover 3 is pivotably supported on the rear edge of the device body 2 and is constantly urged in an opening direction by a spring or other urging member (not shown). An open button 4 is provided on the top surface of the device body 2 adjacent to the cover 3. The cover 3 is unlocked from the device body 2 by pressing the open button 4, allowing the force of the urging member to open the cover 3. A window 5 covered by a transparent cover (not shown) is provided in the center of the cover 3.

While not shown in the drawings, a battery accommodating section is provided in a prescribed region of the device body 2 (near the rear surface, for example). A conventional battery 130 (FIG. 15) (or other electrical storage device) is detachably accommodated in the battery accommodating section as a power supply for the label maker 1.

Figure 3:
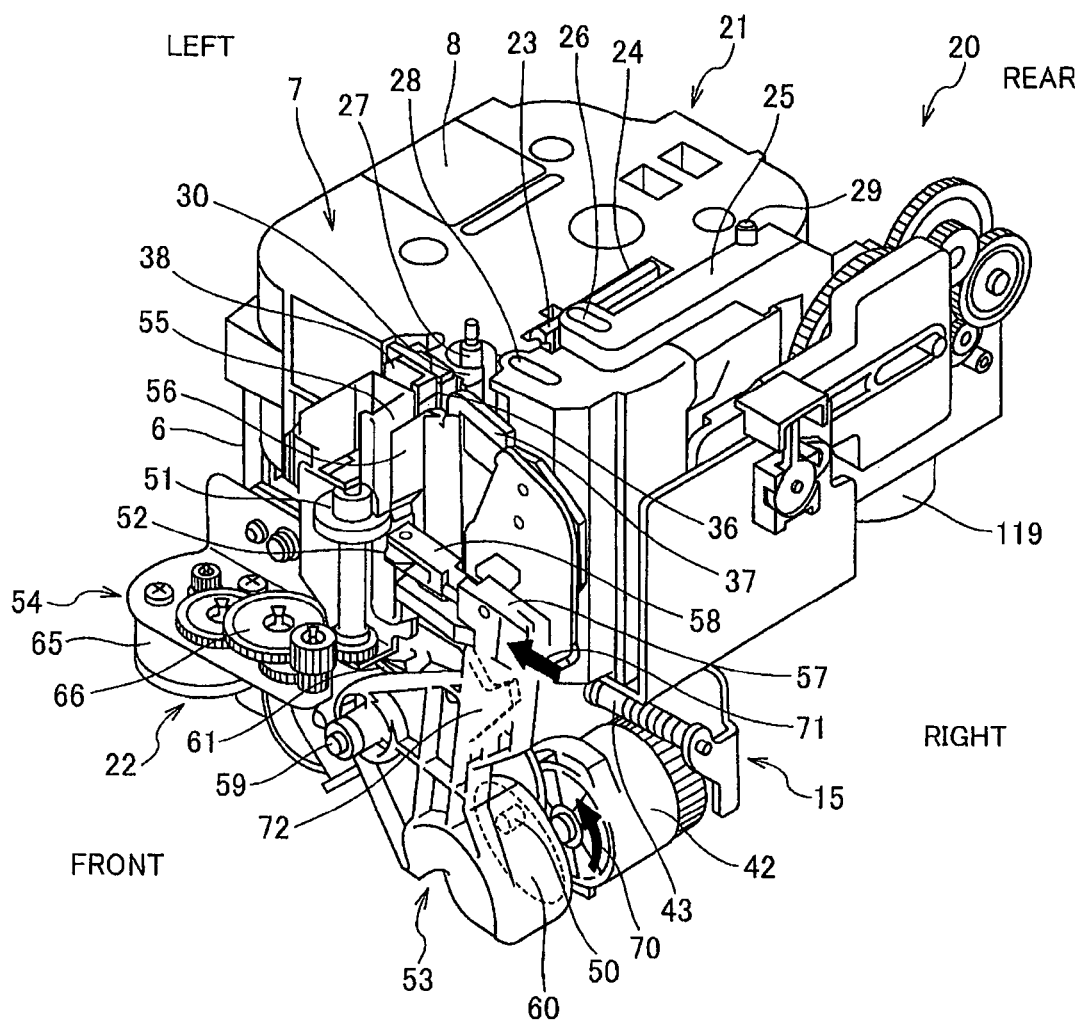
FIG. 3 is a perspective view showing the structure of an internal unit provided in the label maker.

An internal unit 20 shown in FIG. 3 is provided in the device body 2. Note that a loop antenna LC described later has been omitted from FIG. 3. As shown in FIG. 3, the internal unit 20 primarily includes a cartridge holder 6 for accommodating a cartridge 7, a printing mechanism 21 including a print head (thermal head) 23, a cutting mechanism 15, a half-cut unit 35 (FIG. 8), and a discharging mechanism 22.

Figure 4:
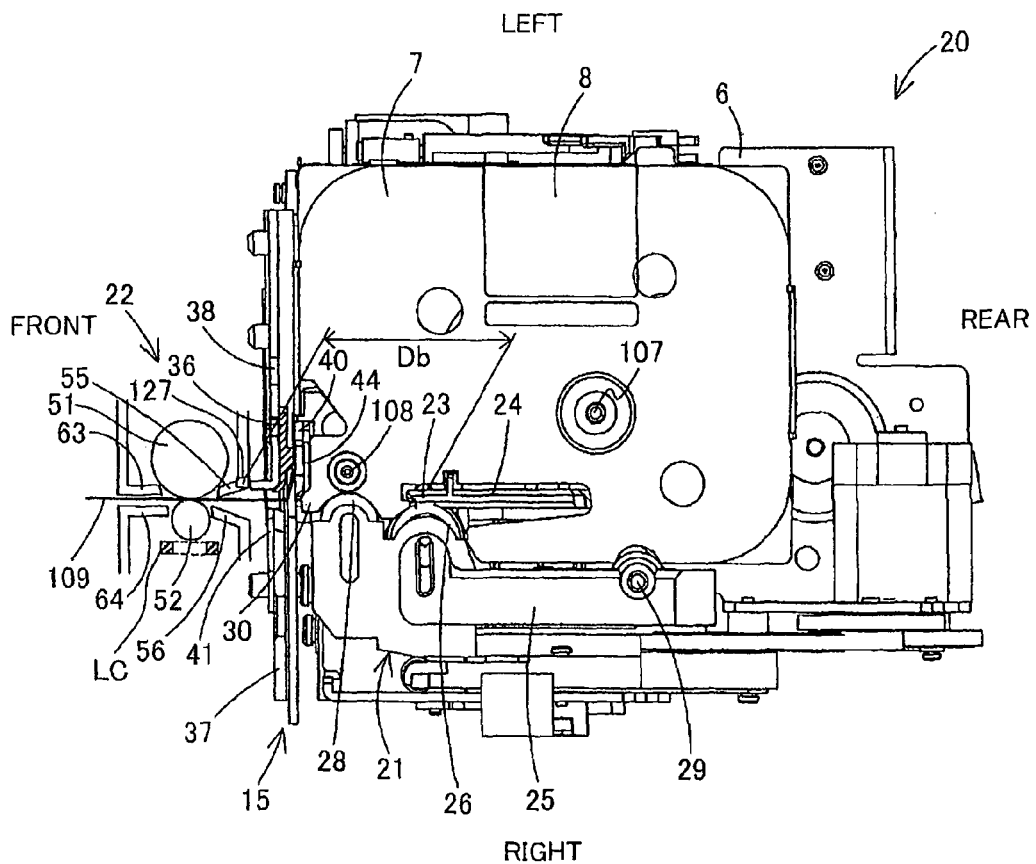
FIG. 4 is a top view showing the structure of the internal unit.

FIG. 4 is a top view showing the structure of the internal unit 20. FIG. 5(a) is a view conceptually showing a detailed structure of the cartridge 7.

As shown in FIG. 5(a), the cartridge 7 includes a casing 7A and, disposed within the casing 7A, a first roll (tag tape roll) 102, a second roll 104, a ribbon supply roll 107 for feeding out an ink ribbon 105, a ribbon take-up roller 106 for taking up the ink ribbon 105 after printing, a tape feeding roller 27, and a guide roller 112. The tape feeding roller 27 is rotatably supported near a tape discharge section 30 (FIG. 4) formed to the casing 7A of the cartridge 7.

The ribbon take-up roller 106 and the tape feeding roller 27 are mounted on drive shafts 106a and 108, respectively. A drive force from a conveying motor 119 (see FIG. 3), which is a pulse motor, for example, provided outside the cartridge 7, is transferred to the drive shafts 106a and 108 via a gear mechanism (not shown), driving the ribbon take-up roller 106 and the tape feeding roller 27 to rotate in association.

As shown in FIG. 5(a), the first roll 102 includes a band-shaped base tape (tag tape) 101 wound about a reel member 102a extending in a direction perpendicular to the sheet surface of FIG. 5(a). The second roll 104 includes a transparent cover film 103 wound around a reel member 104a. The cover film 103 has substantially the same width as the base tape 101.

As shown in FIG. 5(b), the base tape 101 has a four-layer structure formed by sequentially laminating, from the inner side to the outer side, an adhesive layer 101a formed of a suitable adhesive, a plurality of antenna base materials 101b configured of sheet-like pieces having a substantially uniform thickness, an adhesive layer 101c formed of an appropriate adhesive, and a release layer 101d, in this order.

The antenna base materials 101b are arranged at prescribed intervals in the longitudinal direction of the base tape 101. Each of the antenna base materials 101b has a rectangular planner shape and is embedded with a RFID circuit element To in its inner surface facing the adhesive layer 101a. Each RFID circuit element To includes an IC chip 151 for storing data and a loop antenna 152 for transmitting and receiving data. The loop antenna 152 is formed in the shape of a loop coil and connected to the IC chip 151. The loop antenna 152 and the IC chip 151 are substantially flush with the inner surface of the antenna base material 101b.

The cover film 103 is later printed with a label image R (FIG. 18(a)) and bonded to the inner surface of the antenna base material 101b through the adhesive layer 101a. The release layer 101d is bonded to the outer side of the antenna base material 101b through the adhesive layer 101c.

The guide roller 112 is for regulating the conveying position of the base tape 101. The tape feeding roller 27 functions as a pressure roller for pressing against and bonding the base tape 101 and the cover film 103 printed with the label image R to form a printed label tape 109, while conveying the printed label tape 109 in a tape conveying direction DS.

The RFID label T (FIG. 18(a)) is ultimately produced by cutting the printed label tape 109 and be affixed to a desired product or the like through the adhesive layer 101c after peeling off the release layer 101d. Sensor marks PM are provided on the outer surface of the release layer 101d at prescribed positions corresponding to the RFID circuit elements To. In this example, the sensor mark PM is a black bar.

Figure 6:
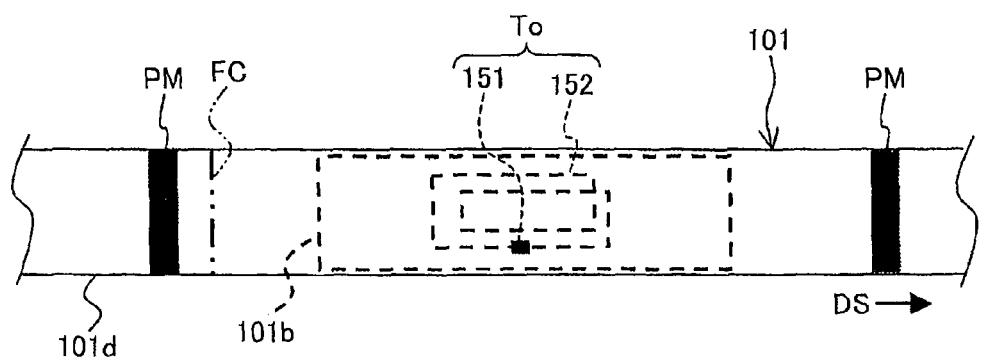
FIG. 6 is a conceptual view of the base tape from the perspective indicated by an arrow aD in FIG. 5(a), showing the general structure of a RFID circuit element provided in the base tape.

FIG. 6 is a conceptual view of the base tape 101 showing the general structure of the RFID circuit element To, as viewed from the direction indicated by an arrow aD in FIG. 5(a). A full-cut line FC along which the base tape 101 (printed label tape 109) is cut is located upstream of the sensor mark PM in the tape conveying direction DS.

Note that the cartridge holder 6 accommodates the cartridge 7 so that the printed label tape 109 is discharged through the label outlet 11 with the width dimension orthogonal to the sheet surface of FIG. 5(a).

As shown in FIG. 5(a), the print head 23 is positioned upstream of the tape feeding roller 27 in the tape conveying direction DS. The print head 23 is provided with a plurality of heating elements and, as shown in FIG. 4, mounted on a head mount 24 that is erected from the cartridge holder 6.

As shown in FIG. 3, a roller holder 25 is rotatably supported on a support shaft 29 positioned at the right side of the cartridge 7. A switching mechanism (not shown) is provided for switching the roller holder 25 between a printing position shown in FIG. 4 and a release position (not shown). As shown in FIG. 4, a platen roller 26 and a pressure roller 28 are rotatably provided in the roller holder 25. When the roller holder 25 is switched to the printing position, the platen roller 26 and the pressure roller 28 contact the print head 23 and the tape feeding roller 27, respectively, as shown in FIG. 5(a).

With this construction, when the cartridge 7 is mounted in the cartridge holder 6, the base tape 101 paid out from the first roll 102 is supplied to the tape feeding roller 27. Also, the ink ribbon 105 paid out from the ribbon supply roll 107 is pressed against the underside surface of the cover film 103 paid out from the second roll 104, at the position of the print head 23.

When the roller holder 25 is moved from the release position to the printing position in this state, the cover film 103 and the ink ribbon 105 are pinched between the print head 23 and the platen roller 26, and the base tape 101 and the cover film 103 are pinched between the tape feeding roller 27 and the pressure roller 28. The conveying motor 119 (FIG. 15) subsequently drives the ribbon take-up roller 106 and the tape feeding roller 27 to rotate simultaneously in the directions indicated by arrows aB and aC, respectively. Since the drive shaft 108 is coupled to the pressure roller 28 and the platen roller 26 via a gear mechanism (not shown), the tape feeding roller 27, the pressure roller 28, and the platen roller 26 rotate together with the driving of the drive shaft 108, so that the base tape 101 is paid out from the first roll 102 and supplied to the tape feeding roller 27.

On the other hand, the cover film 103 is paid out from the second roll 104, and a printing drive circuit 120 (see FIG. 15) supplies electricity to the plurality of heating elements in the print head 23. As a result, the print head 23 prints the label image R (FIG. 18(a)) on the cover film 103. Here, the label image R printed by the print head 23 corresponds to data stored in the RFID circuit element To of a section of the base tape 101 to be bonded to the cover film 103. After the label image R has been printed on the cover film 103, the cover film 103 is bonded to the base tape 101 by the tape feeding roller 27 and the pressure roller 28, forming the integrated printed label tape 109. Thereafter, the printed label tape 109 is discharged from the cartridge 7 through the tape discharge section 30 (FIG. 4) in the tape conveying direction DS. After printing is completed on the cover film 103, the ink ribbon 105 is taken up on the ribbon take-up roller 106 driven by the drive shaft 106a.

As shown in FIG. 4, a tape feature display unit 8 is provided on the top surface of the casing 7A of the cartridge 7 for displaying the width, color, and the like of the base tape 101 accommodated in the cartridge 7. When the cover 3 shown in FIG. 2 is closed after mounting the cartridge 7 in the cartridge holder 6, the window 5 and the tape feature display unit 8 are positioned in confrontation with each other so that a user outside the device body 2 can view the tape feature display unit 8 through the transparent cover of the window 5, enabling the user to easily detect the type of the cartridge 7 mounted in the cartridge holder 6 through the window 5.

Figure 7A:
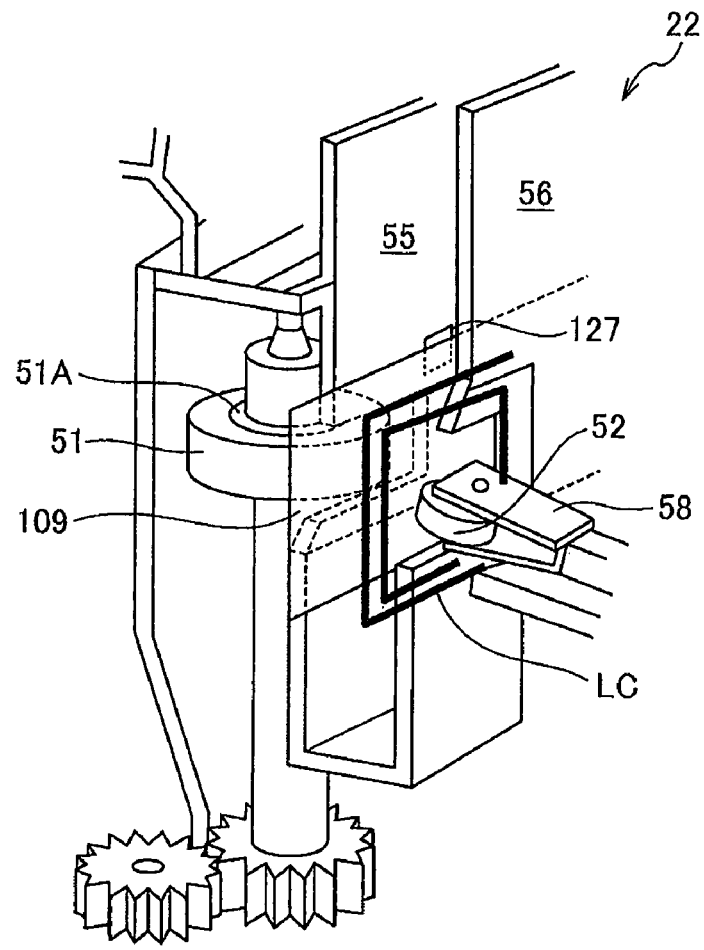
FIG. 7(a) is a perspective view showing a detailed structure of part of a discharging mechanism of the label maker.

The internal unit 20 further includes the loop antenna LC shown in FIG. 7(a) that wirelessly reads data from and writes data to the RFID circuit element To. After the printed label tape 109 is produced as described above, the loop antenna LC reads data from or writes data to the RFID circuit element To of the printed label tape 109. Subsequently, the cutting mechanism 15 cuts the printed label tape 109 either automatically or based on an operation of the cut button 16 (FIG. 2) to produce the RFID label T. The RFID label T is then discharged through the label outlet 11 by the discharging mechanism 22.

As shown in FIG. 4, first guide walls 55 and 56 and second guide walls 63 and 64 are provided rearward of the label outlet 11 for guiding the printed label tape 109 to the label outlet 11. The first guide walls 55 and 56 are integrally formed with each other, and the second guide walls 63 and 64 are integrally formed with each other. The first guide walls 55 and 56 and the second guide walls 63 and 64 are disposed with a prescribed gap formed therebetween at a predetermined discharge position.

The discharging mechanism 22 (FIG. 3) is disposed near the label outlet 11. As shown in FIG. 3, the discharging mechanism 22 includes a drive roller 51, a pressure roller 52, a pressure activation mechanism 53, and a discharge drive mechanism 54. The pressure roller 52 confronts the drive roller 51 via the printed label tape 109. The pressure activation mechanism 53 operates to apply pressure to the pressure roller 52 so that the pressure roller 52 presses the printed label tape 109 or release such pressure.

The pressure activation mechanism 53 includes a roller support holder 57, a roller support part 58, a holder support part 59, a cam 60, and a spring 61.

The roller support part 58 is mounted on the roller support holder 57 and holds the pressure roller 52 on a distal end thereof. The holder support part 59 pivotably supports the roller support holder 57. The cam 60 drives the pressure activation mechanism 53 in association with the cutting mechanism 15.

More specifically, as shown in FIG. 7(a), the roller support part 58 rotatably supports the pressure roller 52 by gripping the pressure roller 52 from and below. Portions of the first guide walls 55 and 56 have been cut away, and the drive roller 51 is positioned in the cutout portion of the first guide wall 55 confronting the discharge position of the printed label tape 109. The drive roller 51 has a cutout part 51A formed as a concentric groove in the top surface thereof. The pressure roller 52 is supported by the roller support part 58 of the pressure activation mechanism 53 so as to confront the discharge position through cutout portion of the first guide wall 56.

Referring to FIG. 3, when a helical gear 42 of the cutting mechanism 15 rotates, the cam 60 makes the roller support holder 57 pivot counterclockwise (indicated by an arrow 71 in FIG. 3) about the holder support part 59, pressing the pressure roller 52 against the printed label tape 109. When the helical gear 42 rotates again, the roller support holder 57 pivots in a direction opposite the direction indicated by the arrow 71 due to the spring 61, separating the pressure roller 52 from the printed label tape 109.

The discharge drive mechanism 54 operates in association with the above-described pressing and releasing operations of the pressure activation mechanism 53 and rotates the drive roller 51 to discharge the printed label tape 109 (RFID label T). The discharge drive mechanism 54 includes a discharge motor 65 and a gear train 66. When the pressure roller 52 presses the printed label tape 109 against the drive roller 51, the discharge motor 65 drives the drive roller 51 to rotate in a direction for discharging the printed label tape 109. Accordingly, the printed label tape 109 is forcibly discharged in the tape conveying direction DS.

As shown in FIG. 7(a), the loop antenna LC is disposed near the pressure roller 52 such that the pressure roller 52 is positioned in the diametrical center of the loop antenna LC. The loop antenna LC is configured to access (read data from or write data to) the RFID circuit element To through magnetic induction (including electromagnetic induction, magnetic coupling, or any other noncontact method utilizing an electromagnetic field).

Figure 7B:
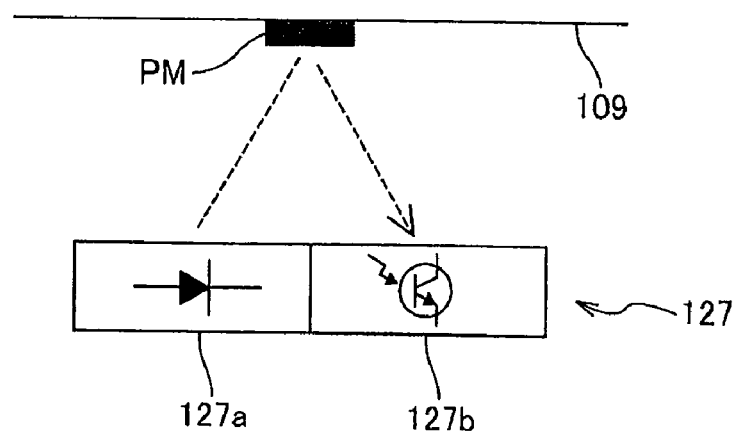
FIG. 7(b) is an explanatory diagram illustrating the structure of a mark sensor of the label maker.

A mark sensor 127 is disposed upstream of the drive roller 51 in the tape conveying direction DS (that is, between a half cutter 34 described later and the loop antenna LC). The mark sensor 127 is capable of detecting the sensor mark PM (FIG. 6) provided on the release layer 101d of the base tape 101. As shown in FIG. 7(b), the mark sensor 127 is a reflective photoelectric sensor well known in the art and includes a light-emitting element 127a configured of a light-emitting diode, and a light-receiving element 127b configured of a phototransistor, for example. Output from the light-receiving element 127b reverses according to the presence of the sensor mark PM between the light-emitting element 127a and the light-receiving element 127b. Note that the mark sensor 127 is not limited to a reflective sensor, but may also be a transmitting photoelectric sensor.

Here, the first guide wall 56 shown in FIG. 7(a) confronting the mark sensor 127 is formed of a color that does not reflect light emitted from the light-emitting element 127a or has a sloped surface that prevents the light-receiving element 127b from receiving reflected light.

As the printed label tape 109 moves and the leading edge of the sensor mark PM arrives at the position of the mark sensor 127, the position of the cover film 103 corresponding to the RFID circuit element To (a portion of the cover film 103 that is to be bonded to a portion of the base tape 101 where the RFID circuit element To is provided) arrives at the position of the print head 23. Thus, when the mark sensor 127 detects the sensor mark PM, the print head 23 begins printing the label image R (two lines of the character array "ABCD" in the example shown in FIG. 18(a)) on the underside surface of the cover film 103. The label image R is printed in mirror image on the underside surface of the cover film 103 so as to appear normally from the top side of the cover film 103.

Figure 9:
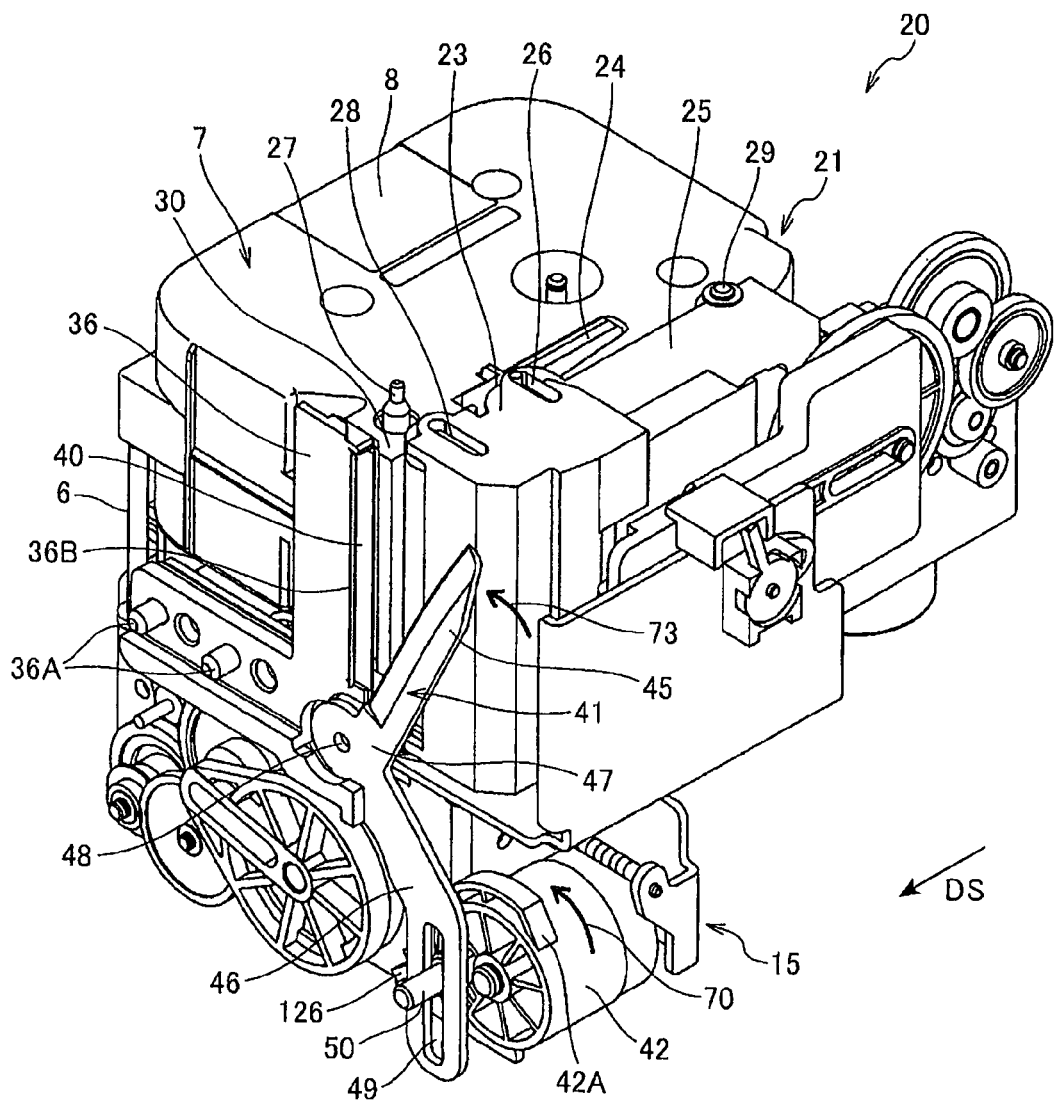
FIG. 9 is a perspective view showing the appearance of a cutting mechanism when a half cutter has been removed from the internal unit.

As shown in FIG. 9, the cutting mechanism 15 includes a fixed blade 40, a movable blade 41 for performing a cutting operation together with the fixed blade 40, the helical gear 42 coupled with the movable blade 41, and a cutter motor 43 (FIG. 3) coupled with the helical gear 42 through a gear train (not shown).

The fixed blade 40 is fixed to a side plate 44 (FIG. 4) that is erected at the left side of the cartridge holder 6 within the cutting mechanism 15 by screws or the like inserted through fixing holes 40A (FIG. 11) thereof.

Figure 11:
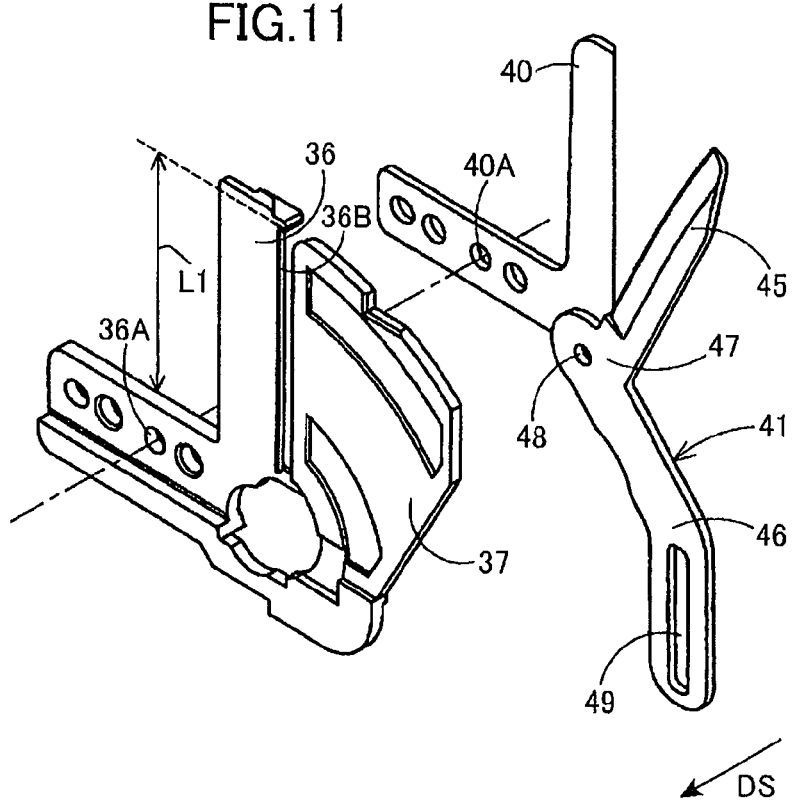
FIG. 11 is an exploded perspective view showing the detailed structure of a movable blade and a fixed blade, as well as a half-cut unit.
Figure 12:
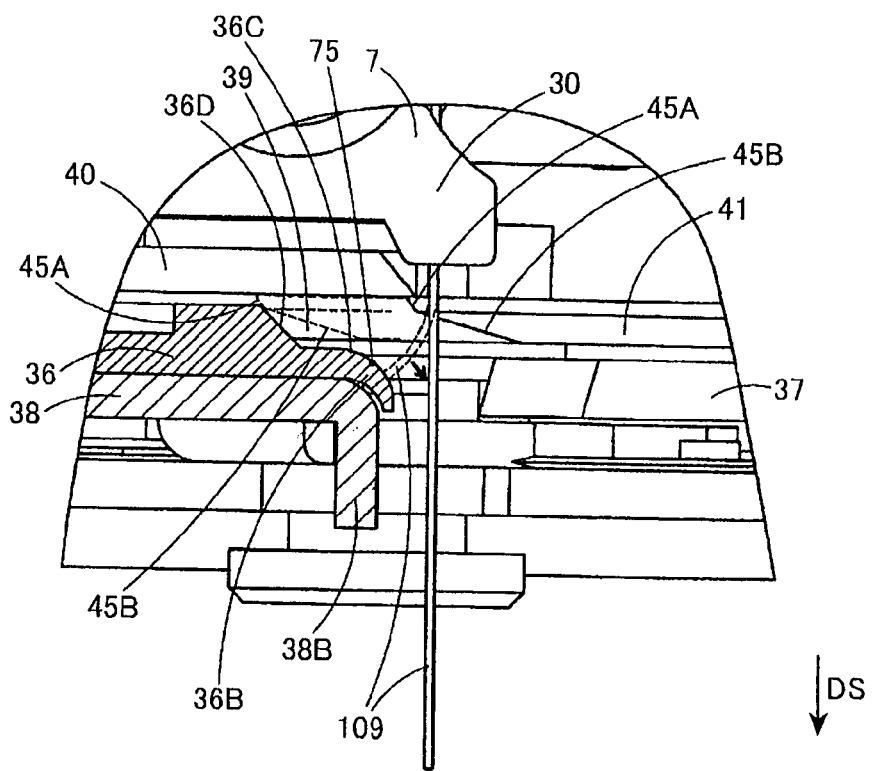
FIG. 12 is an enlarged cross-sectional view showing part of the structure in FIG. 10.
Figure 13:
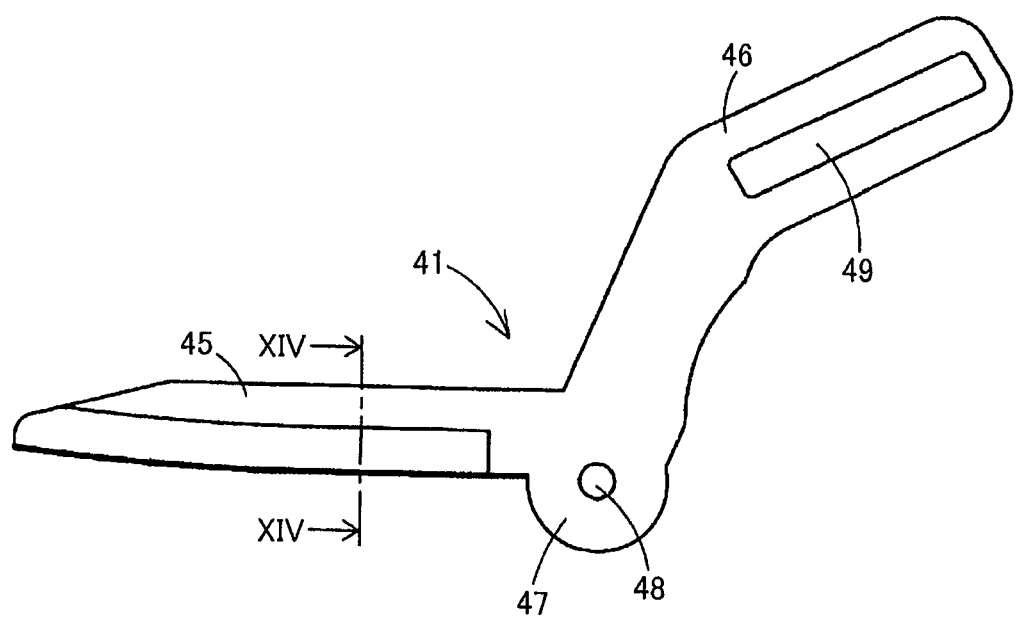
FIG. 13 is a front view showing the appearance of the movable blade.

FIG. 11 is a perspective view showing the structure of the fixed blade 40 and the movable blade 41 in detail, as well as the half-cut unit 35. FIG. 12 is an enlarged cross-sectional view showing part of this construction. FIG. 13 is a front view showing the appearance of the movable blade 41, and FIG. 14 is a cross-sectional view of the movable blade 41 along the line XIV-XIV in FIG. 13.

As shown in FIGS. 11 and 13, the movable blade 41 is substantially V-shaped, and includes a blade part 45, a handle part 46, and a curved part 47 provided therebetween. The curved part 47 is formed with a shaft hole 48. The movable blade 41 is supported on the side plate 44 (FIG. 4) via the shaft hole 48 such that the movable blade 41 can pivot about the shaft hole 48. The handle part 46 is formed with an elongated hole 49.

Figure 14:
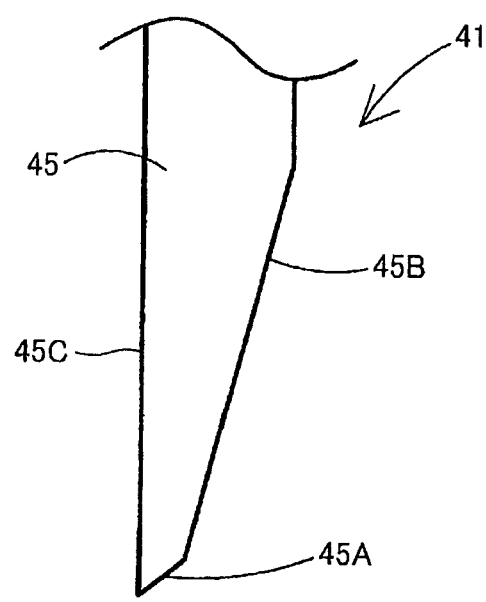
FIG. 14 is a cross-sectional view of the movable blade taken along the line XIV-XIV in FIG. 13.

As shown in FIG. 14, the blade part 45 is a two-stage blade having a first sloped surface 45A and a second sloped surface 45B with different angles of inclination for gradually reducing the thickness of the blade part 45. The first sloped surface 45A is angled at 50 degrees to a rear surface 45C of the blade part 45, for example.

Figure 10:
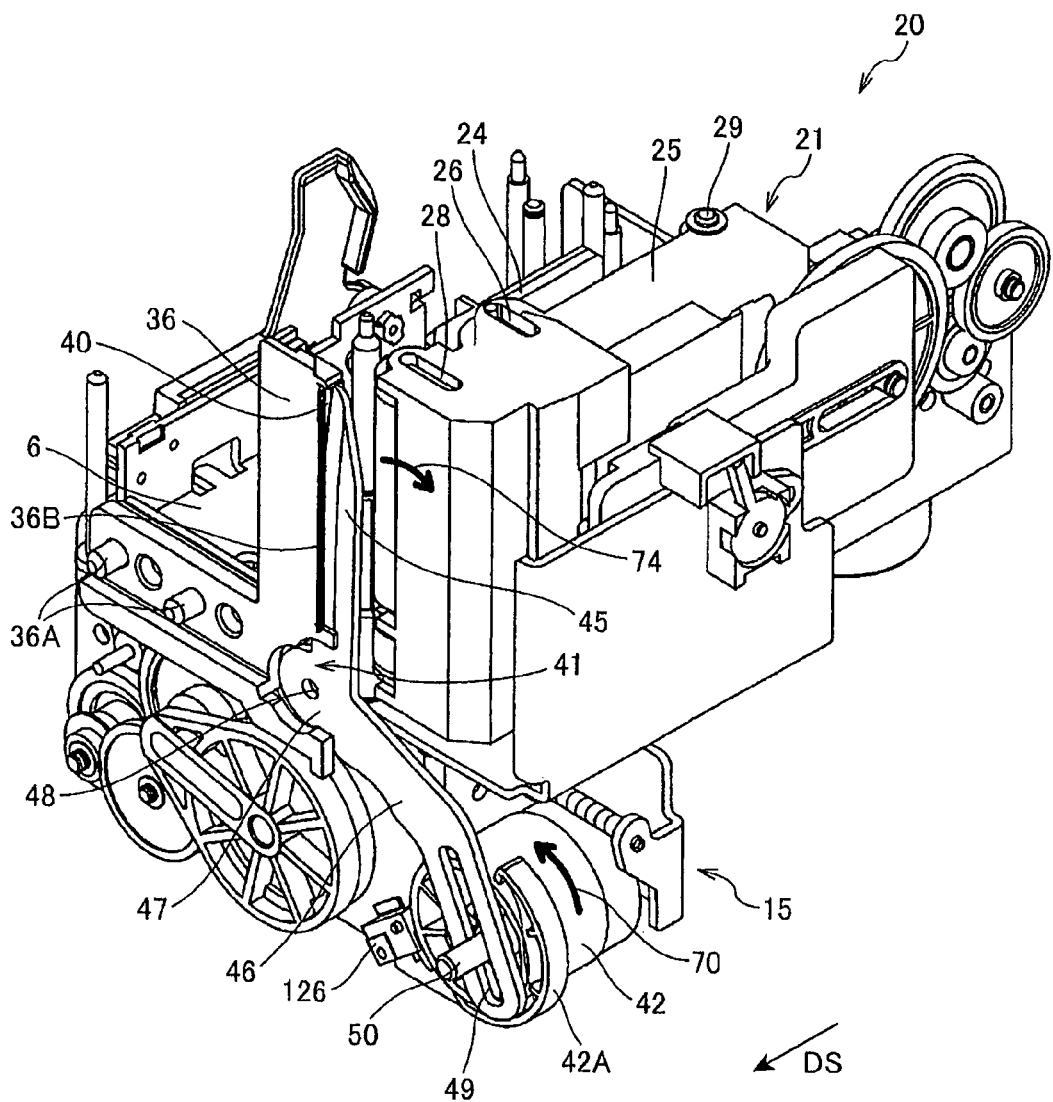
FIG. 10 is a perspective view showing the appearance of the cutting mechanism when the half cutter has been removed from the internal unit.

FIGS. 9 and 10 are perspective views showing the appearance of the cutting mechanism 15 when the half cutter 34 has been removed from the internal unit 20.

As shown in FIGS. 9 and 10, when the cutter motor 43 (FIG. 3) of the cutting mechanism 15 drives the helical gear 42 to rotate, the movable blade 41 pivots about the shaft hole 48 through the engagement of the elongated hole 49 and a boss 50, that is provided as a protrusion on the helical gear 42, so as to cut the printed label tape 109.

That is, initially the movable blade 41 is separated from the fixed blade 40 (see FIG. 9; hereinafter referred to as the initial state) when the boss 50 of the helical gear 42 is positioned on the inner side (left side in FIG. 9). If the cutter motor 43 is driven in this initial state so that the helical gear 42 rotates counterclockwise (in the direction indicated by an arrow 70), then the boss 50 moves toward the outer side, causing the movable blade 41 to pivot counterclockwise (the direction indicated by an arrow 73) about the shaft hole 48 and cut the printed label tape 109 together with the fixed blade 40 fixed on the internal unit 20 (see FIG. 10; hereinafter referred to as the cutting state).

After cutting the printed label tape 109 in this way to produce a RFID label T, the movable blade 41 must be returned to the initial state in order to cut the printed label tape 109 to produce a next RFID label T. Therefore, the cutter motor 43 is driven to rotate the helical gear 42 counterclockwise, thereby moving the boss 50 inward again and pivoting the movable blade 41 clockwise (indicated by an arrow 74) away from the fixed blade 40 (see FIG. 9). At this time, the cutting mechanism 15 is ready to cut the printed label tape 109 conveyed from the cartridge 7.

A helical gear cam 42A is disposed on the cylindrical outer wall of the helical gear 42. When the cutter motor 43 drives the helical gear 42 to rotate, the helical gear cam 42A functions to switch a microswitch 126 disposed adjacent to the helical gear 42 from an OFF state to an ON state. Turning ON the microswitch 126 in this way makes it possible to detect the cut state of the printed label tape 109.

The half-cut unit 35 is mounted downstream of the fixed blade 40 and the movable blade 41 in the tape conveying direction DS so as to be positioned between the blades 40, 41 and the guide walls 55, 56 (see FIG. 4).

Figure 8:
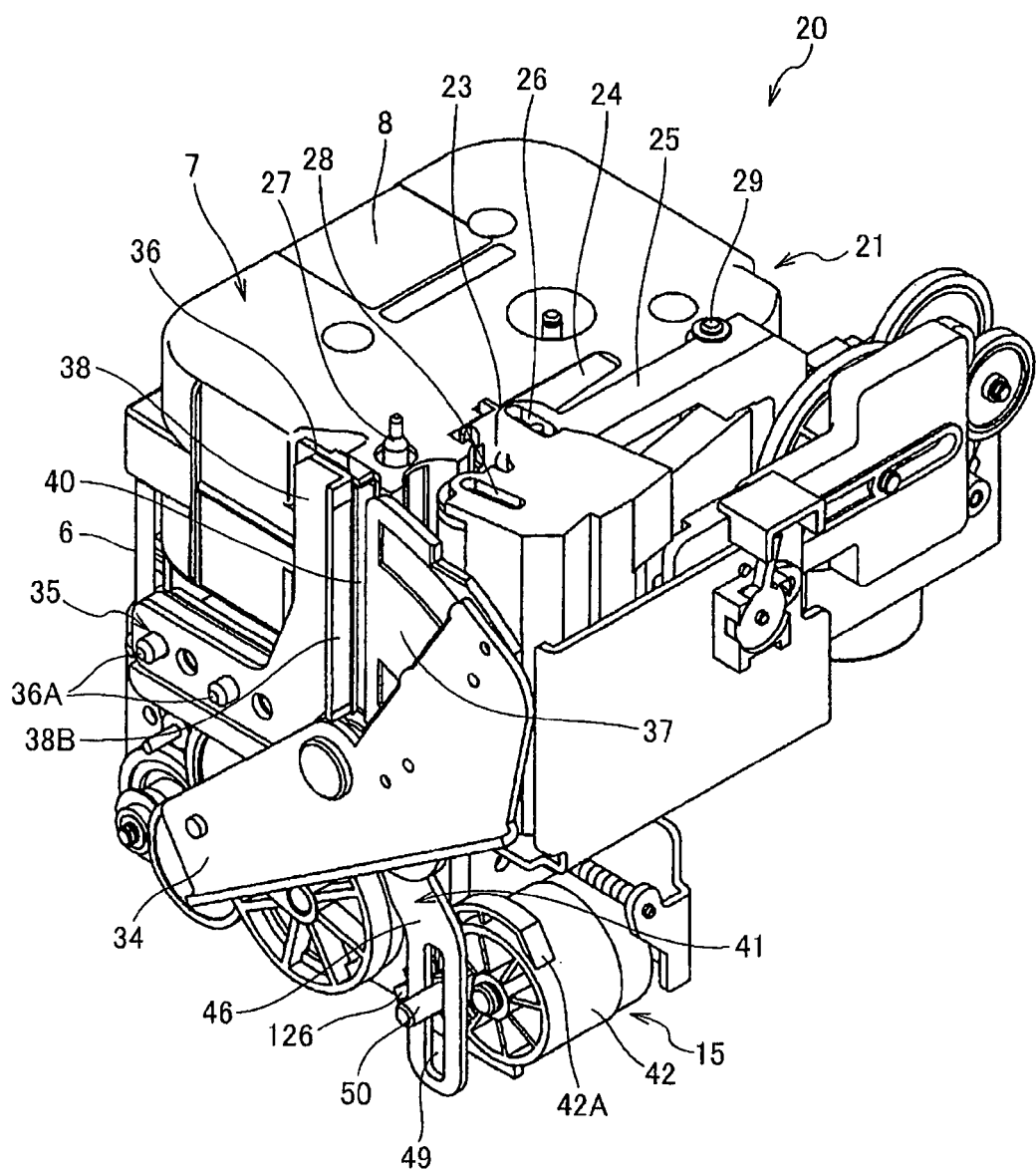
FIG. 8 is a perspective view showing the appearance of the internal unit when the discharging mechanism has been removed from the structure shown in FIG. 3.

FIG. 8 is a perspective view showing the appearance of the internal unit 20 when the discharging mechanism 22 has been removed from the structure shown in FIG. 3. As shown in FIG. 8, the half-cut unit 35 includes a receiving base 38, the half cutter 34, a first guide part 36, and a second guide part 37.

The half cutter 34 is disposed on the movable blade 41 side opposing the receiving base 38. The first guide part 36 is disposed between the fixed blade 40 and the receiving base 38 and aligned with both the fixed blade 40 and the receiving base 38. The second guide part 37 is disposed in confrontation with the first guide part 36 and aligned with the movable blade 41. As shown in FIG. 11, the first guide part 36 and the second guide part 37 are integrally formed and fixed to the side plate 44 (FIG. 4) together with the fixed blade 40 through guide fixing parts 36A provided at positions corresponding to the fixing holes 40A of the fixed blade 40.

A half cutter motor 129 (FIG. 15) is provided for pivoting the half cutter 34 about a prescribed rotational point (not shown). While a mechanism for driving the half cutter 34 using the half cutter motor 129 is not shown in the drawings, this drive mechanism may be configured as follows. For example, the half cutter motor 129 may be an electric motor that is configured to rotate the half cutter motor 129 forward and in reverse and connected via a gear train to a crank member having a pin, while an elongated groove may be formed in the half cutter 34 for engaging with the pin of the crank member. When the driving force of the half cutter motor 129 pivots the crank member, the pin of the crank member moves along the elongated groove so that the half cutter 34 can pivot in a prescribed direction (clockwise or counterclockwise).

As shown in FIG. 8, an end of the receiving base 38 opposing the printed label tape 109 discharged from the tape discharge section 30 is bent to form a receiving surface 38B that is parallel to the printed label tape 109. Here, as described above, the printed label tape 109 has a five-layer structure formed by bonding the cover film 103 to the base tape 101, where the base tape 101 has a four-layer structure including the adhesive layer 101a, the antenna base materials 101b, the adhesive layer 101c, and the release layer 101d. When the half cutter 34 is pressed against the receiving surface 38B using the driving force of the half cutter motor 129, as described above, the cover film 103, the adhesive layer 101a, the antenna base material 101b, and the adhesive layer 101c of the printed label tape 109 positioned between the half cutter 34 and the receiving surface 38B are cut, while leaving only the release layer 101d uncut, thereby forming a half-cut line HC1, HC2 (see FIG. 18(a)) in substantially the width direction W of the printed label tape 109. Here, a slipping clutch (not shown) interposed in the gear train of the above construction, for example, is preferably configured to prevent an excessive load being applied to the half cutter motor 129 when the half cutter 34 contacts the receiving surface 38B. The receiving surface 38B also functions, together with the first guide walls 55 and 56, to guide the printed label tape 109 to the label outlet 11.

As shown in FIG. 11, an edge 36B of the first guide part 36 facing the discharged printed label tape 109 protrudes along the receiving surface 38B of the receiving base 38 and curves toward the tape conveying direction DS. Hence, as shown in FIG. 12, the edge 36B of the first guide part 36 has a smooth curved surface along the tape conveying direction DS.

By extending the edge 36B of the first guide part 36 and forming a contact surface 36C as a curved surface thereon, the leading edge of the printed label tape 109 curled at a fixed curvature or greater initially contacts the contact surface 36C of the first guide part 36. If the leading edge of the printed label tape 109 contacts the contact surface 36C at a position downstream of a boundary point 75 with respect to the tape conveying direction DS in which the printed label tape 109 is discharged, the leading edge of the printed label tape 109 moves downstream along the curved contact surface 36C and, hence, is guided toward the label outlet 11 without entering between the fixed blade 40 and the first guide part 36 or the receiving base 38.

Further, the first guide part 36 is formed so that a guide width L1 (see FIG. 11) for the conveying path of the printed label tape 109 is greater than the maximum width of the printed label tape 109 provided in the cartridge 7 (36 mm in this embodiment). Also, as shown in FIG. 12, an inner surface 36D is also formed continuously with the contact surface 36C on the first guide part 36. The inner surface 36D opposes the first and second sloped surfaces 45A and 45B of the movable blade 41. The inner surface 36D is contacted by part of the first and second sloped surfaces 45A and 45B of the movable blade 41 when cutting. Since the movable blade 41 is formed with a two-stage blade, a gap 39 is formed between the surfaces 36C, 36D of the first guide part 36 and the second sloped surface 45B of the movable blade 41 when the movable blade 41 cuts the printed label tape 109.

Figure 15:
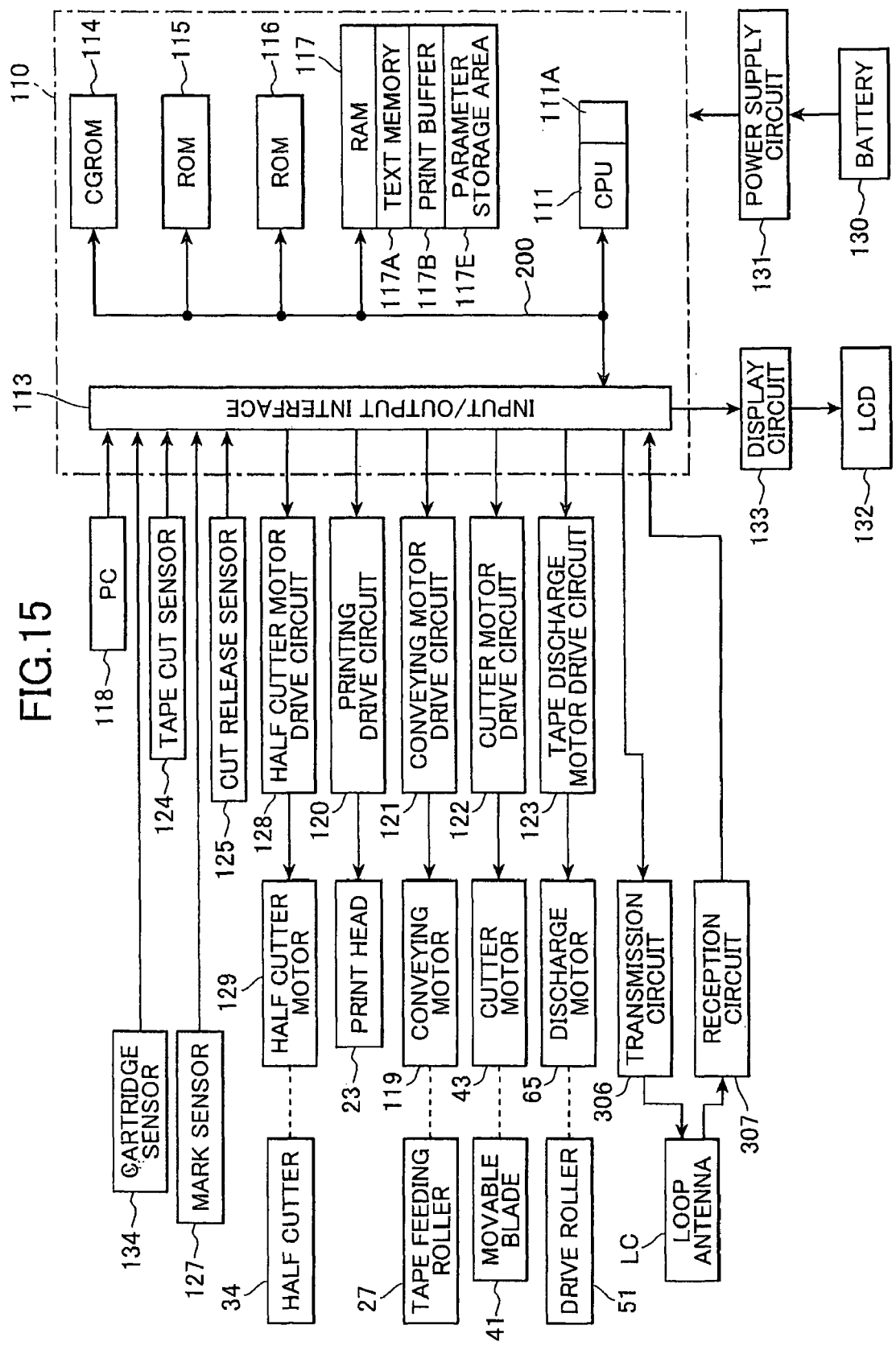
FIG. 15 is a block diagram illustrating functions of a control system in the label maker.

FIG. 15 is a block diagram illustrating functions of a control system in the label maker 1 according to the present embodiment. In FIG. 15, a control circuit 110 is provided on a circuit board (not shown) of the label maker 1.

The control circuit 110 includes a CPU 111, an input/output interface 113, a CGROM 114, ROMs 115 and 116, and a RAM 117. The CPU 111 has a built-in timer 111A and functions to control the components of the control circuit 110. The input/output interface 113, the CGROM 114, the ROMs 115 and 116, and the RAM 117 are connected to the CPU 111 via a data bus 200.

The CGROM 114 is a character generator (CG) for displaying information on an LCD 132, such as a message to replace the battery 130. The CGROM 114 stores dot pattern data for each of a plurality of characters in association with code data.

The ROM 115 stores dot pattern data for a plurality of characters sorted for each font (such as Gothic fonts and Roman fonts) and in association with the character size for each font and code data. This dot pattern data is used to print alphabetic characters, symbols, and other characters. The ROM 115 also stores graphic pattern data for printing graphics that include gray-scale rendering.

The dot pattern data for displaying and printing stored in the CGROM 114 and the ROM 115 described above can be read by the PC 118 via the network NW (FIG. 1). The data received on the PC 118 side can subsequently be displayed or printed.

The ROM 116 stores a printing control program, a pulse number determining program, a cutting control program, a tape discharge program, and various other programs required for controlling the label maker 1. The printing control program is for reading data from a print buffer associated with the code data for alphanumeric characters and the like inputted from the PC 118, and for driving the print head 23, the conveying motor 119, and the discharge motor 65 based on the data. The pulse number determining program is for determining a number of pulses corresponding to the amount of energy required to form dots. The cutting control program is for driving the conveying motor 119 after printing is completed to convey the printed label tape 109 to a cutting position and for driving the cutter motor 43 to cut the printed label tape 109. The tape discharge program is for driving the discharge motor 65 to forcibly discharge the cut printed label tape 109 (i.e., the RFID label T) from the label outlet 11. The CPU 111 performs various calculations based on these programs stored in the ROM 116.

The RAM 117 includes a text memory 117A, a print buffer 117B, and a parameter storage area 117E. The text memory 117A stores text data inputted from the PC 118. The print buffer 117B stores dot patterns for printing a plurality of characters, symbols, and the like as dot pattern data, and a pulse number indicating the amount of energy required for forming each dot. The print head 23 prints dots based on the dot pattern data stored in the print buffer 117B. The parameter storage area 117E stores various computational data.

The input/output interface 113 is connected to the PC 118, a cartridge sensor 134, the printing drive circuit 120, a conveying motor drive circuit 121, a cutter motor drive circuit 122, a half cutter motor drive circuit 128, a tape discharge motor drive circuit 123, a transmission circuit 306, a reception circuit 307, a display circuit 133, the mark sensor 127, a tape cut sensor 124, and a cut release sensor 125. The cartridge sensor 134 is configured of a mechanical, optical, magnetic, or other type sensor well known in the art for detecting when the cartridge 7 is mounted in the label maker 1. The printing drive circuit 120 is for driving the print head 23, and the conveying motor drive circuit 121 is for driving the conveying motor 119. The cutter motor drive circuit 122 is for driving the cutter motor 43, and the half cutter motor drive circuit 128 is for driving the half cutter motor 129. The tape discharge motor drive circuit 123 is for driving the discharge motor 65. The transmission circuit 306 is for generating a carrier wave to access (read/write) the RFID circuit element To via the loop antenna LC and to modulate the carrier wave based on control signals inputted from the control circuit 110. The reception circuit 307 is for demodulating a response signal received from the RFID circuit element To via the loop antenna LC and outputting the demodulated signal to the control circuit 110. The display circuit 133 is for controlling the display on the LCD 132. The mark sensor 127 is for detecting the sensor mark PM.

The battery 130 is connected to a power supply circuit 131. The power supply circuit 131 receives power supplied from the battery 130 when the power button 14 is in an ON state and supplies power regulated at a prescribed voltage to the control circuit 110 and the like.

With this control system built around the control circuit 110, when the PC 118 inputs text data or the like into the control circuit 110, the control circuit 110 sequentially stores the text data in the text memory 117A. Further, the control circuit 110 drives the print head 23 via the printing drive circuit 120 and selectively heats the heating elements corresponding to one line worth of print dots in order to print dot pattern data stored in the print buffer 117B. At the same time, the control circuit 110 controls the conveying motor 119 via the conveying motor drive circuit 121 to convey the tape. Further, the transmission circuit 306 controls modulation of the carrier wave based on control signals received from the control circuit 110, while the reception circuit 307 processes demodulated signals based on control signals received from the control circuit 110.

The tape cut sensor 124 and the cut release sensor 125 are configured of the helical gear cam 42A provided on the outer cylindrical surface of the helical gear 42, and the microswitch 126 (see FIGS. 9 and 10). Specifically, when the cutter motor 43 rotates the helical gear 42, the helical gear cam 42A functions to switch the microswitch 126 from an OFF state to an ON state, by which it can be detected that the movable blade 41 has completed cutting the printed label tape 109. The tape cut sensor 124 is achieved through this configuration. When the helical gear 42 rotates again, the helical gear cam 42A functions to switch the microswitch 126 from the ON state to the OFF state, by which it can be detected that the movable blade 41 has returned to the release position. The cut release sensor 125 is achieved through this configuration.

Figure 16:
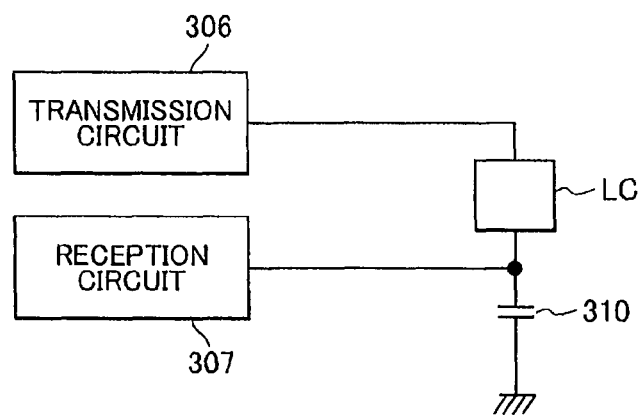
FIG. 16 is a circuit diagram showing a simple configuration of circuit connections among a transmission circuit, a reception circuit, and a loop antenna shown in FIG. 15.

FIG. 16 is a circuit diagram showing a simple configuration of circuit connections among the transmission circuit 306, the reception circuit 307, and the loop antenna LC. As shown in FIG. 16, the transmission circuit 306 is connected to the loop antenna LC, while the reception circuit 307 is connected to a capacitor 310 connected in series with the loop antenna LC.

Figure 17:
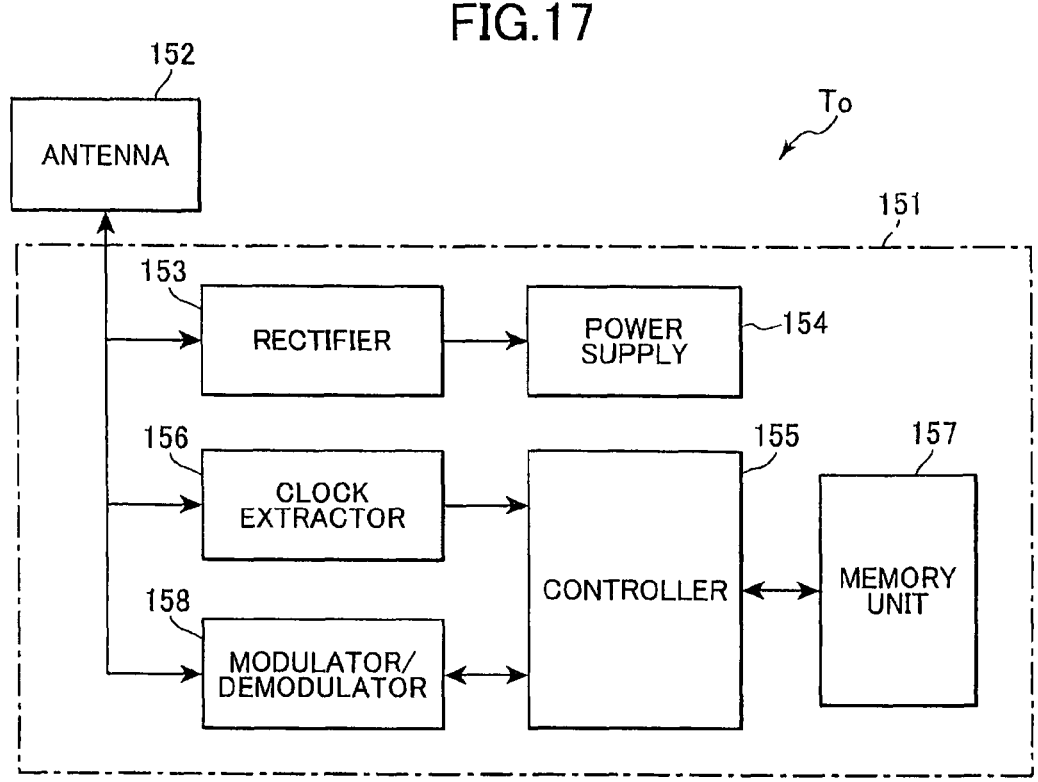
FIG. 17 is a block diagram showing the functions of a RFID circuit element provided in the base tape.

FIG. 17 is a block diagram showing the functions of the RFID circuit element To. As shown in FIG. 17, the RFID circuit element To includes the loop antenna 152 that exchanges signals with the loop antenna LC through magnetic induction, and the IC chip 151 connected to the loop antenna 152.

The IC chip 151 includes a rectifier 153, a power supply 154, a clock extractor 156, a memory unit 157, a modulator/demodulator 158, and a controller 155. The rectifier 153 is for rectifying a carrier wave received by the loop antenna 152. The power supply 154 is for storing energy from the carrier wave rectified by the rectifier 153 as driving power. The clock extractor 156 is for extracting a clock signal from the carrier wave received by the loop antenna 152 and supplying the clock signal to the controller 155. The memory unit 157 is capable of storing prescribed data signals. The modulator/demodulator 158 is connected to the loop antenna 152. The modulator/demodulator 158 demodulates a transmission signal received by the loop antenna 152 from the loop antenna LC and modulates and reflects the carrier wave received by the loop antenna 152 based on a response signal from the controller 155. The controller 155 is for controlling the operations of the RFID circuit element To through the rectifier 153, the clock extractor 156, the modulator/demodulator 158, and the like.

The controller 155 interprets a received signal demodulated by the modulator/demodulator 158, generates a return signal based on data signals stored in the memory unit 157, controls the response by the modulator/demodulator 158, and other basic control.

Figure 19:
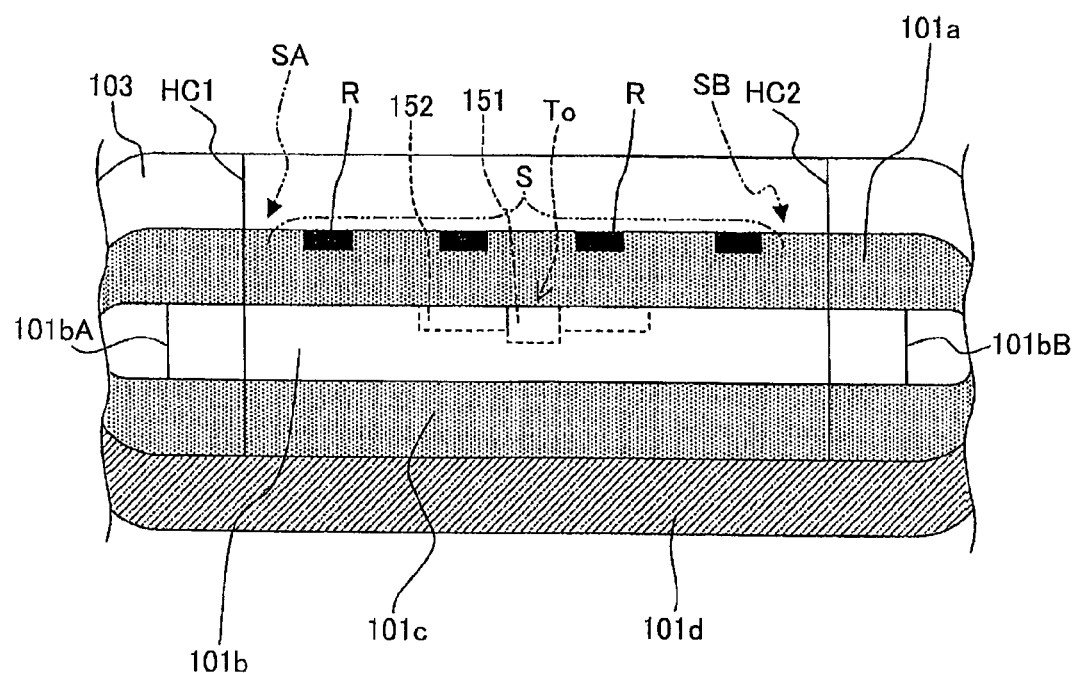
FIG. 19 is a vertical cross-sectional view taken along the line XIX-XIX in FIG. 18(a)

FIG. 18 illustrates an example of a RFID label T formed by the label maker 1 having the structure described above, where FIG. 18(a) is a plan view of the RFID label T in partial phantom, and FIG. 18(b) is an explanatory diagram showing the dimensions of the RFID label T in FIG. 18(a). FIG. 19 is a vertical cross-sectional view taken along a line XIX-XIX in FIG. 18(a). The RFID label T is obtained by writing data to (or reading data from) the RFID circuit element To and cutting the printed label tape 109 along the full-cut line FC.

As described above, the printed label tape 109 (i.e., the RFID label T) has a five-layer structure including the cover film 103, the adhesive layer 101a, the antenna base material 101b, the adhesive layer 101c, and the release layer 101d laminated one on the other in this order. Also, the RFID circuit element To is disposed in the antenna base material 101b on the side of the adhesive layer 101a. The label image R corresponding to data stored on the RFID circuit element To and the like (in this example, two rows of the character array "ABCD" indicating the type of RFID label T) is printed on the underside surface of the cover film 103.

Further, the front half-cut line HC1 and the rear half-cut line HC2 are formed in the cover film 103, the adhesive layer 101a, the antenna base material 101b, and the adhesive layer 101c along the width of the printed label tape 109 by the half cutter 34. A region of the cover film 103 interposed between the half-cut lines HC1 and HC2 serves as a printing region S in which the label image R is printed. As shown in FIG. 18(b), a length D between longitudinal ends 101bA and 101bB of the antenna base material 101b is at least as long as a length A between longitudinal ends SA and SB of the printing region S. In this example, the length D is set greater than the length A (i.e., D>A). The longitudinal ends of the RFID label T from the printing region S to the half-cut, lines HC1 and HC2 are a front margin S1 and a rear margin S2. The sensor mark PM is provided in the front margin S1 of the RFID label T.

As described above, while the cover film 103, the adhesive layer 101a, the adhesive layer 101c, and the release layer 101d are formed continuously in the longitudinal direction of the RFID label T, the antenna base materials 101b are provided discontinuously (intermittently). Accordingly, as shown in FIG. 19, irregularities are formed in layers positioned on either side of the antenna base material 101b in the thickness direction near the ends 101bA and 101bB of the antenna base material 101b depending on the presence of the antenna base material 101b. These irregularities produce wrinkles in the layered structure.

However, as shown in FIG. 18(b), by setting the length D of the antenna base material 101b in the RFID label T greater than or equal to the length A of the printing region S, it is possible to set the positions of the ends 101bA and 101bB of the antenna base material 101b equal to or farther outside of the longitudinal ends SA and SB of the printing region S. Also, the printed label tape 109 is cut at the full-cut line FC (FIG. 18(a)) positioned outside of the antenna base material 101b. Therefore, the wrinkles produced in the RFID label T are positioned longitudinally inside the cutting plane and on the longitudinal edges SA and SB or longitudinally outside of the printing region S. This makes it possible to prevent a distortion of the label image R printed in the printing region S caused by such wrinkling, thereby improving readability of the label image R.

Further, because the RFID label T is formed by cutting the printed label tape 109 along the full-cut line FC, which position does not include the loop antenna 152 of the RFID circuit element To provided in the antenna base material 101b, it is possible to prevent harm to the communication function of the RFID circuit element To by cutting the loop antenna 152, thereby ensuring reliable communications.

It should be noted that in place of the black marking shown in FIG. 18(a), the sensor mark PM may be configured of a hole formed by a laser or the like so as to substantially penetrate the base tape 101 (in this case, the cover film 103 is not penetrated). In this case, a light emitted from the light-emitting element 127a passes through the hole formed as the sensor mark PM and the transparent cover film 103 when the hole arrives at a position between the light-emitting element 127a and the light-receiving element 127b. Consequently, the light is not reflected and not received by the light-receiving element 127b, thereby reversing the output from the light-receiving element 127b.

Figure 20:
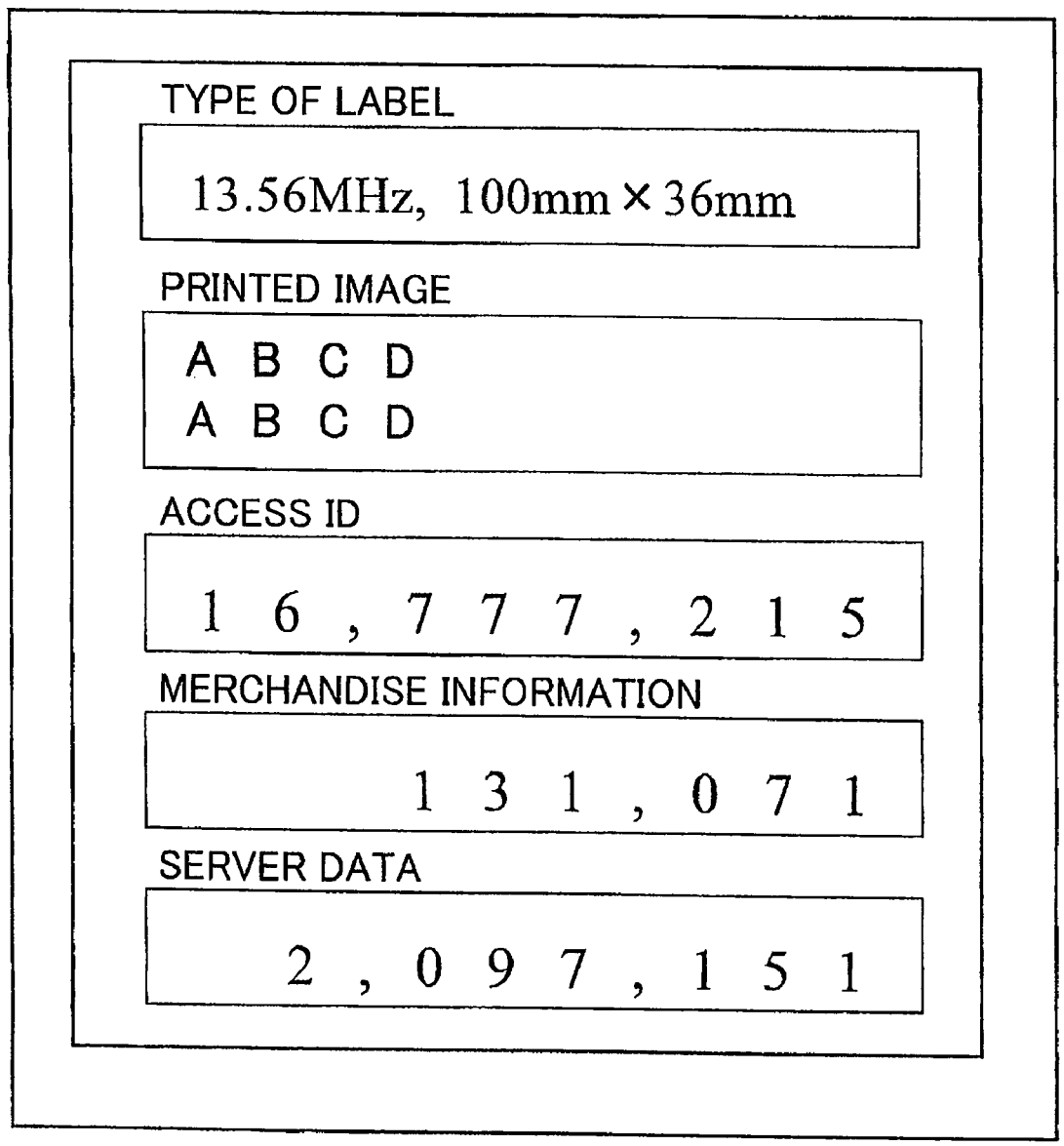
FIG. 20 is an explanatory diagram showing a sample display on a PC when the label maker accesses RFID tag data in an IC chip of the RFID circuit element.

The PC 118 can access (reads or writes) RFID tag data in the IC chip 151 of the RFID circuit element To. FIG. 20 shows a sample display on the PC 118 when the PC accesses the RFID tag data.

In the example of FIG. 20, the PC 118 can display such data as the type of RFID label T (access frequency and tape dimensions), the label image R printed in correspondence with the RFID circuit element To, an access ID serving as a unique tag ID of the RFID circuit element To, the address of merchandise information stored on the data servers IS, and the storage address for the corresponding data on the root server RS. Through operations on the PC 118, the user can operate the label maker 1 to print the label image R on the cover film 103 and to write or read data, such as the access ID and the merchandise information, in or from the IC chip 151.

An association of the access ID of the RFID circuit element To of the RFID label T and data read from the IC chip 151 of the RFID label T (or data written to the IC chip 151) is stored in the root server RS when reading or writing, as described above, so the data can be referenced as needed.

Figure 21:
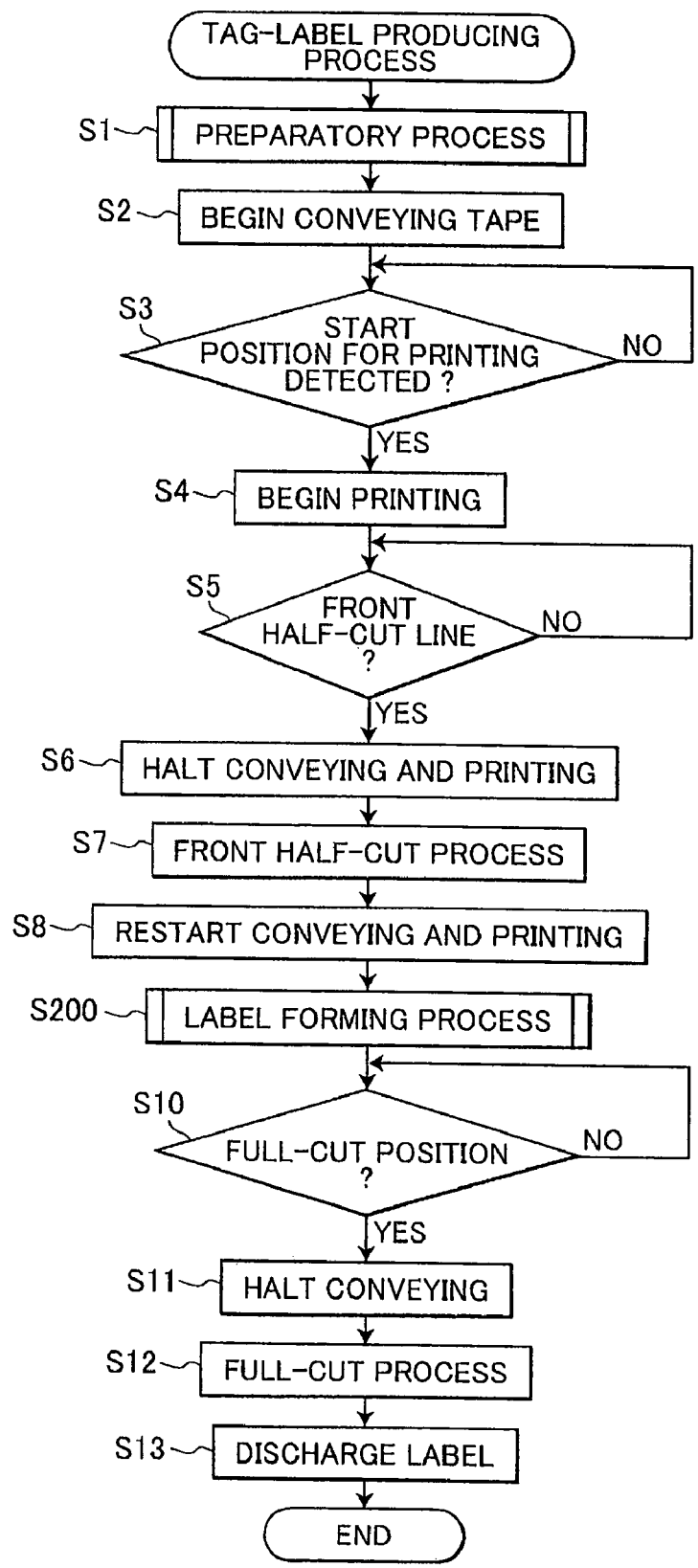
FIG. 21 is a flowchart representing a tag-label producing process executed in the label maker.

With the label maker 1 having the basic structure described above, the cutting mechanism 15 cuts the printed label tape 109 to produce the RFID label T after the loop antenna LC has read data from or written data to the RFID circuit element To. FIG. 21 is a flowchart illustrating steps in a label producing process executed by the control circuit 110 for producing the RFID label T.

The label producing process shown in FIG. 21 begins when the label maker 1 receives a control signal from the PC 118 via the network NW and the input/output interface 113, instructing the label maker 1 to produce a desired RFID label T. First, in S1, the control circuit 110 executes a preparatory process based on the control signal received from the PC 118 for setting various data including print data, transmission data for the RFID circuit element To, the positions of the front and rear half-cut lines HC1 and HC2, and the position of the full-cut lines FC. The preparatory process will be described in detail with reference to the flowchart shown in FIG. 22.

Figure 22:
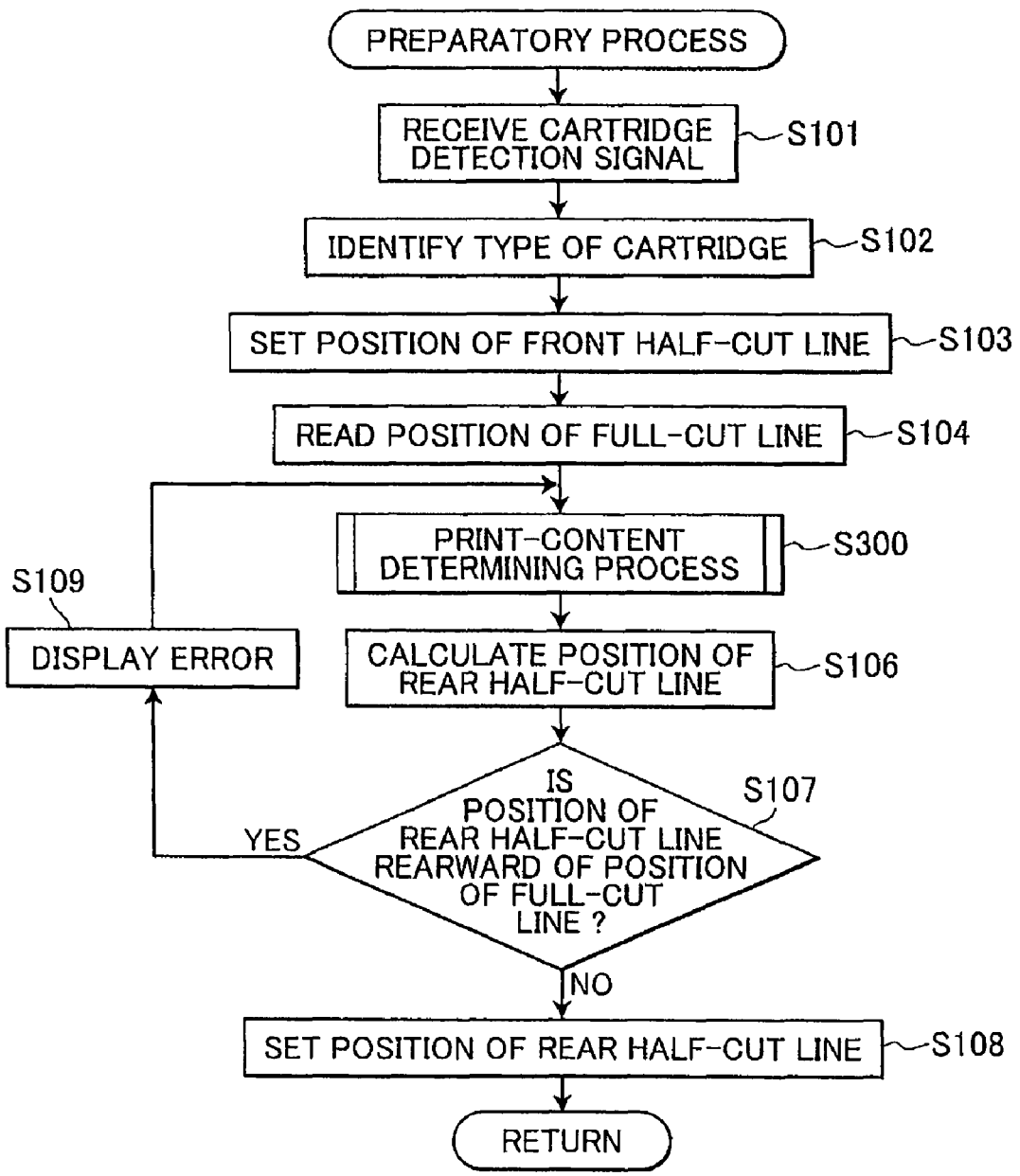
FIG. 22 is a flowchart representing a preparatory process executed in S1 of FIG. 21.

In S101 of FIG. 22, the cartridge sensor 134 detects whether the cartridge 7 is mounted in the label maker 1 and inputs a cartridge detection signal to the control circuit 110. When the cartridge detection signal is received, the CPU 111 determines in S102 the type of cartridge 7. In S103, the CPU 111 reads the position of the front half-cut line HC1 from the ROM 116 based on the determined type of cartridge 7 and sets the same in the RAM 117. Here, correlations between the type of cartridge and the position of the corresponding front half-cut line HC1 are stored in the ROM 116 in advance, for example.

In S104, the CPU 111 reads the position of the full-cut line FC for the maximum print length from the ROM 116 based on the detected type of cartridge 7. Here, correlations between the type of cartridge and the position of the corresponding full-cut line FC are stored in the ROM 116 in advance, for example. Then, the process advances to S300 for executing a print content determining process.

Figure 23:
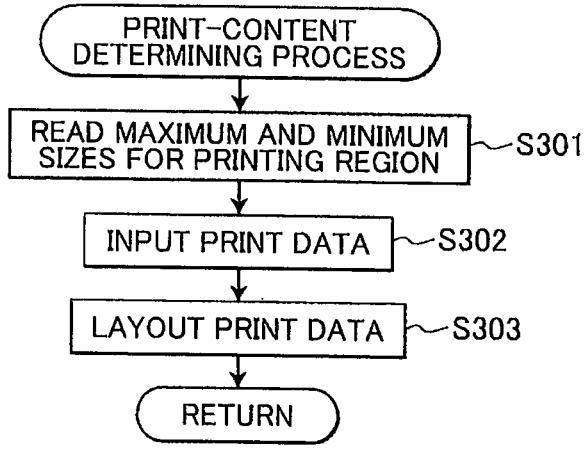
FIG. 23 is a flowchart representing a print-content determining process executed in S300 of FIG. 22.

As shown in FIG. 23, when the print content determining process starts, first the CPU 111 reads data indicating the maximum print size (in other words, the maximum length of the print region S in the tape conveying direction DS) and data indicating the minimum print size (in other words, the minimum length of the print region S in the tape conveying direction DS) from the ROM 116 based on the detected type of cartridge 7. Correlations of the cartridge types and corresponding maximum and minimum print sizes are stored in the ROM 116 in advance, for example. Then, in S302, the CPU 111 receives print data inputted through operations by an operator. In S303, the CPU 111 lays out the print data in a predetermined format. At this time, a printing length and a print end position of the print data are also determined.

After completing this layout in S303, the CPU 111 returns to S106 of FIG. 22 and calculates the position of the rear half-cut line HC2 based on the printing length determined in S303. In S107, the CPU 111 determines whether the calculated position of the rear half-cut line HC2 is rearward of the position of the full-cut line FC read in S104 with respect to the tape conveying direction DS. If not (S107: NO), then in S108, the CPU 111 sets this calculated position of the rear half-cut line HC2, thus ending the preparatory process, and advances to S2 in FIG. 21. On the other hand, if so (S107: YES), this means that the printing length is too long and thus the printing region S is too large, and the process advances to S109. In S109, the CPU 111 displays an error message on the LCD 132, and the process returns to S300 to repeat the above processes until a suitable printing length (printing region S with a suitable length) is obtained so that a negative determination is made in S107. In this manner, the dimension of the printing region S is regulated in accordance with the cartridge type.

It should be noted that it is possible to insert steps after S106 (prior to S107 or prior to S108, for example) for determining whether the position of the rear half-cut line HC2 calculated in S106 is farther rearward than the rear edge of the RFID circuit element To and for performing an error process to display an error message, as described in S109, when this condition is not met. This process reliably prevents the RFID circuit element To from being cut, which can harm the communication function therein, thereby ensuring reliable communications, even when the RFID label T is set to various lengths.

Returning to S2 of FIG. 21, the CPU 111 outputs control signals to the conveying motor drive circuit 121 via the input/output interface 113, and the drive force generated by the conveying motor drive circuit 121 drives the tape feeding roller 27 and the ribbon take-up roller 106 to rotate. The CPU 111 also outputs control signals to the discharge motor 65 via the tape discharge motor drive circuit 123 for driving the drive roller 51 to rotate. As a result, the base tape 101 paid out from the first roll 102 is supplied to the tape feeding roller 27, while the cover film 103 is paid out from the second roll 104. The cover film 103 is bonded to the base tape 101 by the tape feeding roller 27 and the pressure roller 28 to integrally form the printed label tape 109, and part of the printed label tape 109 is conveyed out of the cartridge 7 and out of the label maker 1.

In S3, the CPU 111 determines whether the sensor mark PM on the base tape 101 has been detected based on detection signals inputted from the mark sensor 127 via the input/output interface 113. In other words, the CPU 111 determines whether the cover film 103 has arrived at the start position for printing with the print head 23. The CPU 111 repeats this determination until the sensor mark PM has been detected before advancing to S4.

In S4, the CPU 111 outputs control signals to the printing drive circuit 120 via the input/output interface 113, and the printing drive circuit 120 begins conducting electricity to the print head 23 in order to begin printing the label image R in the printing region S of the cover film 103. Specifically, the printing region S is the region of the cover film 103 to be bonded to the underside surface of the base tape 101 where the RFID circuit element To exists. The label image R includes characters, symbols, and barcodes corresponding to the print data input in S302.

In S5, the CPU 111 determines whether the position of the front half-cut line HC1 on the printed label tape 109 has reached a half-cut position in which the half cutter 34 of the half-cut unit 35 confronts the printed label tape 109. This determination may be made, for example, according to a prescribed conventional method of detecting the distance that the printed label tape 109 is conveyed after the sensor mark PM is detected; for example, by counting the number of pulses outputted from the conveying motor drive circuit 121 for driving the conveying motor 119. The CPU 111 repeats the determination in S5 until the position of the front half-cut line HC1 reaches the half-cut position before advancing to S6.

In S6, the CPU 111 outputs control signals to the conveying motor drive circuit 121 and the tape discharge motor drive circuit 123 via the input/output interface 113 for halting the drive of the conveying motor 119 and the discharge motor 65 and stopping rotations of the tape feeding roller 27, the ribbon take-up roller 106, and the drive roller 51. Hence, this step results in halting the paying out of the base tape 101 from the first roll 102, the paying out of the cover film 103 from the second roll 104, and the conveyance of the printed label tape 109 when the half cutter 34 of the half-cut unit 35 confronts the position of the front half-cut line HC1 set in S103. At this time, the CPU 111 also outputs control signals to the printing drive circuit 120 via the input/output interface 113 to halt the supply of electricity to the print head 23 in order to stop printing the label image R (cancel print).

In S7, a front half-cut process is executed. Specifically, the CPU 111 outputs control signals to the half cutter motor drive circuit 128 via the input/output interface 113 for driving the half cutter motor 129. The half cutter motor 129 rotates the half cutter 34 to cut the cover film 103, the adhesive layer 101a, the antenna base material 101b, and the adhesive layer 101c of the printed label tape 109, thereby forming the front half-cut line HC1.

In S8, the CPU 111 performs a process similar to S2 for driving the tape feeding roller 27, the ribbon take-up roller 106, and the drive roller 51 to rotate, thereby resuming conveyance of the printed label tape 109, and a process similar to S4 for conducting electricity to the print head 23, thereby resuming printing of the label image R.

In S200, the CPU 111 performs a label forming process to be described later and advances to S10.

In S10, the CPU 111 determines whether the position of the full-cut line FC on the printed label tape 109 has reached a full-cut position in which the movable blade 41 of the cutting mechanism 15 confronts the printed label tape 109. This determination may also be performed according to a prescribed conventional method for detecting the distance the printed label tape 109 is conveyed after detecting the sensor mark PM in S3. The CPU 111 repeats the determination in S10 until the position of the full-cut line FC on the printed label tape 109 reaches the full-cut position before advancing to S1.

In S11, as in S6 described above, the CPU 111 halts the rotations of the tape feeding roller 27, the ribbon take-up roller 106, and the drive roller 51 to halt conveyance of the printed label tape 109. In this way, the CPU 111 halts the payout of the base tape 101 from the first roll 102, the payout of the cover film 103 from the second roll 104, and the conveyance of the printed label tape 109 when the position of the full-cut line FC read in S104 confronts the movable blade 41 of the cutting mechanism 15.

In S12, a full-cut process is executed. Specifically, the CPU 111 outputs control signals to the cutter motor drive circuit 122 for driving the cutter motor 43. The cutter motor 43 rotates the movable blade 41 of the cutting mechanism 15, and the movable blade 41 cuts all of the cover film 103, the adhesive layer 101a, the antenna base material 101b, the adhesive layer 101c, and the release layer 101d of the printed label tape 109 at the full-cut line FC. In this manner, the RFID label T printed with the label image R corresponding to wireless tag data written to or read from the RFID circuit element To is separated from the printed label tape 109.

In S13, the CPU 111 outputs control signals to the tape discharge motor drive circuit 123 via the input/output interface 113, causing the discharge motor 65 to resume rotating the drive roller 51. Consequently, the drive roller 51 resumes conveying the RFID label T produced in S12 toward the label outlet 11 and discharges the RFID label T from the label maker 1 through the label outlet 11, thereby ending the process.

Figure 24:
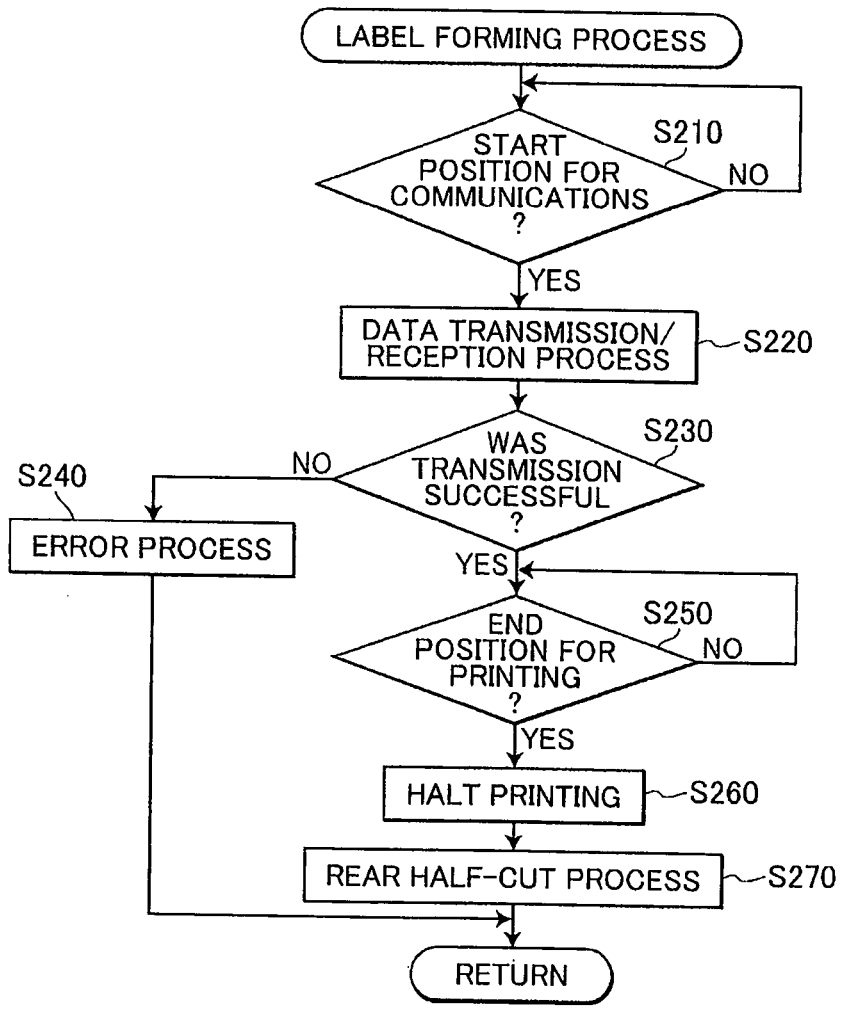
FIG. 24 is a flowchart representing a label forming process executed in S200 of FIG. 21.

FIG. 24 is a flowchart representing the label forming process executed in S200 described above. In this process, first in S210, the CPU 111 determines whether the printed label tape 109 has been conveyed to a communication start position where the RFID circuit element To is close to the loop antenna LC and can communicate with the same. As in S5 of FIG. 21 described above, this determination may be performed according to a prescribed conventional method for detecting the distance that the printed label tape 109 is conveyed after detecting the sensor mark PM in S3. The CPU 111 repeats this determination until the printed label tape 109 has arrived at the communication start position before advancing to S220.

In S220, the CPU 111 performs a data transmission/reception process for wirelessly transmitting and receiving data between the loop antenna LC and the RFID circuit element To and writes data created in S1 of FIG. 21 to the IC chip 151 of the RFID circuit element To (or reads data already stored in the IC chip 151).

In S230, the CPU 111 determines whether the data transmission/reception process in S230 was successful. Specifically, the CPU 111 transmits a "Verify" signal to the RFID circuit element To in S230 and determines whether prescribed data has been stored in the IC chip 151 based on a response signal received from the RFID circuit element To.

If the transmission fails (S230: NO), then in S240, the CPU 111 executes an error process to notify the user of the failed communication and subsequently ends the routine. Here, the error process may involve printing an image of a different form (such as the characters "NG") corresponding to the communication error. However, if the transmission was successful (S230: YES), then the process advances to S250.

In S250, the CPU 111 determines whether the print end position on the printed label tape 109 determined in S303 of FIG. 23 has arrived at the position of the print head 23. This determination may be made according to a prescribed conventional method for detecting the distance that the printed label tape 109 is conveyed after detecting the sensor mark PM in S3, for example. The CPU 111 repeats this determination until the print end position arrives at the position of the print head 23 before advancing to S260.

In S260, as in S6 of FIG. 21, the CPU 111 halts the supply of electricity to the print head 23 to stop printing of the label image R. Consequently, printing of the label image R in the printing region S ends.

In S270, the CPU 111 executes a rear half-cut process. Specifically, the CPU 111 conveys the printed label tape 109 until the position of the rear half-cut line HC2 arrives at the half-cut position and forms the rear half-cut line HC2 with the half cutter 34 of the half-cut unit 35. Subsequently, this routine ends.

Next, various modifications of the above-described first embodiment will be described.

First Modification of the First Embodiment

Figure 25:
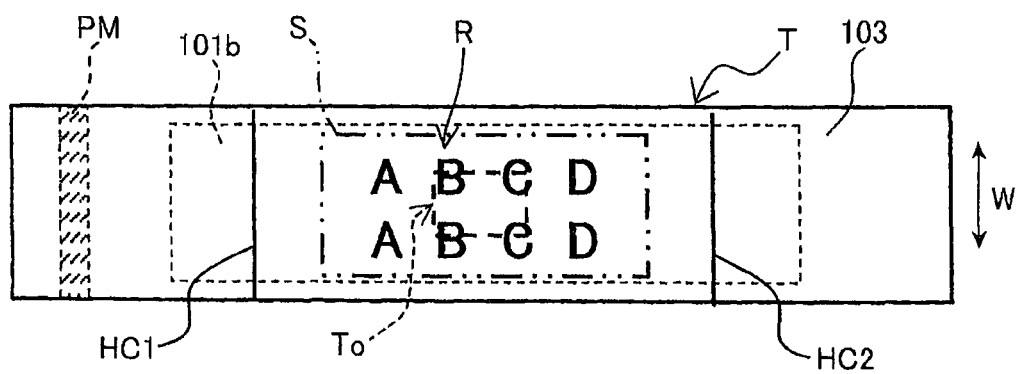
FIG. 25 is a plan view in partial phantom showing a RFID label according to a first modification of the first embodiment in which the antenna base material has a greater width dimension.

As shown in FIG. 25, the dimensions of the antenna base material 101b of the RFID label T may be set greater with respect to the printing region S of the cover film 103, not only in the lengthwise direction parallel to the longitudinal direction of the RFID label T, but also in the widthwise direction W.

In this case, it is possible to position the widthwise edges of the antenna base material 101b along the outer edges of the printing region S or farther outside these edges. This configuration more reliably improves readability of the label image R.

Second Modification of the First Embodiment

Figure 26:
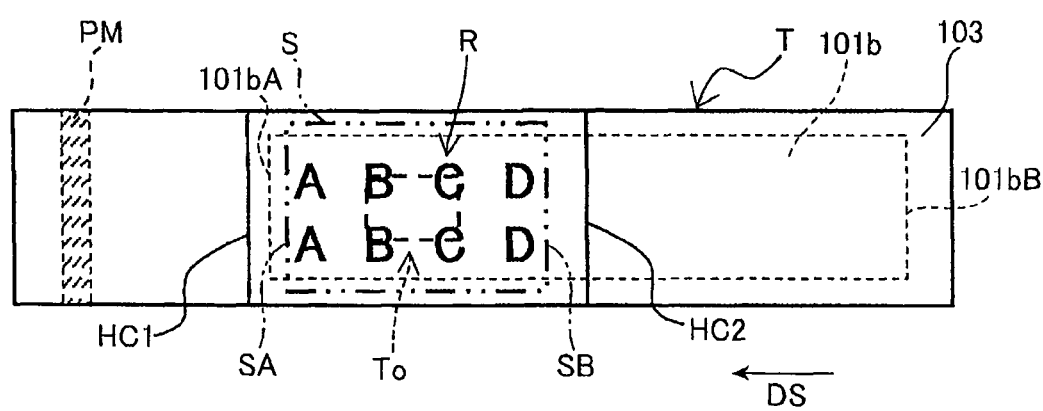
FIG. 26 is a plan view in partial phantom showing a RFID label according to a second modification of the first embodiment in which the antenna base material is shifted rearward.

In this modification, as shown in FIG. 26, the length dimension of the antenna base material 101b is set at least as great as that of the printing region S on the cover film 103. However, the antenna base material 101b is shifted farther rearward on the RFID label T toward the downstream side in the conveying direction DS relative to the RFID circuit element To. The RFID label T is formed by cutting the printed label tape 109 near the longitudinal rear edge 101bB of the antenna base material 101b shifted downstream in this way.

Here, the RFID circuit element To is within the printing region S of the cover film 103 as viewed from the above. The front half-cut line HC1 is positioned outside the front edge 101bA of the antenna base material 101b. The rear half-cut line HC2 is formed outside the rear edge SB of the printing region S, but within the antenna base material 101b.

In this modification also, areas in which wrinkles may appear are positioned on the front and rear edges SA and SB of the printing region S or farther outside, because the length of the antenna base material 101b is at least as long as the printing region S. Hence, this construction also improves visibility of the label image R formed in the printing region S.

Third Modification of the First Embodiment

Figure 27:
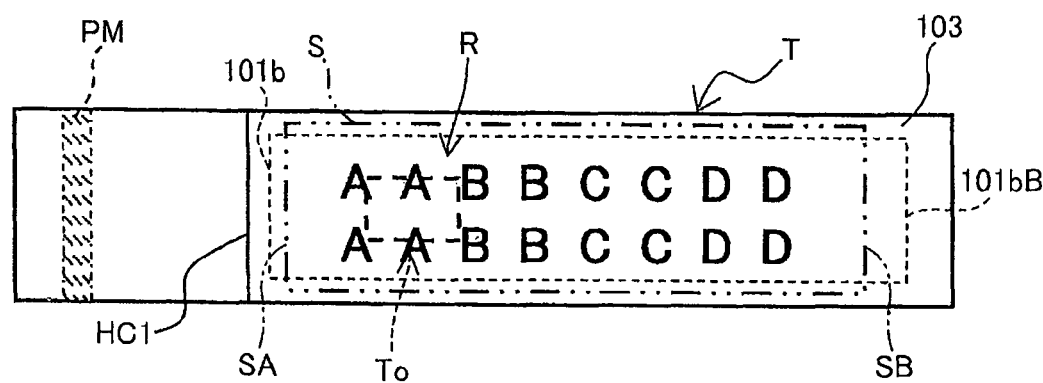
FIG. 27 is a plan view in partial phantom showing a RFID label according to a third modification of the first embodiment having no rear half-cut line.

In the example shown in FIG. 27, the printing region S extends to a point just before the rear edge 101bB of the antenna base material 101b due to a large number of characters in the printed text. In this case, the rear half-cut line HC2 may be omitted.

In this case also, the length of the antenna base material 101b is formed at least as large as the length of the printing region S. Accordingly, regions in which wrinkles may appear are positioned along or farther outside the front and rear edges SA and SB of the printing region S, thereby improving the readability of the label image R.

Fourth Modification of the First Embodiment

As shown in FIG. 28, the position of the full-cut line FC along which the printed label tape 109 is cut may be just in front of the rear edge 101bB of the antenna base material 101b. In other words, the antenna base material 101b may extend farther rearward than the full-cut line FC.

In this case, the RFID label T is produced by cutting the printed label tape 109 through the antenna base material 101b, thereby forming the rear edge of the cut antenna base material 101b flush with the rear edge of the RFID label T (i.e., the position of the full-cut line FC). This method has the effect of eliminating wrinkles in the edge.

In this modification also, as in the above-described third modification shown in FIG. 27, when the printing region S extends to a point just before the rear edge 101bB of the antenna base material 101b, the rear half-cut line HC2 may be omitted as shown in FIG. 29.

Second Embodiment

Next, a second embodiment of the disclosure will be described with reference to FIG. 30(a) to FIG. 31.

In this embodiment, a cartridge 207 shown in FIG. 30(a) is used. In this case, the RFID label T is produced without boding a cover film to a base tape.

Specifically, the cartridge 207 includes a first roll 202, which is configured of a heat-sensitive tape (tag tape) 201 wound about a reel member 202a. The reel member 202a is rotatably fitted over a boss 95 erected from the bottom surface of the cartridge 207. The heat-sensitive tape 201 is a band-like transparent tape having a plurality of RFID circuit elements To formed in series along the longitudinal direction thereof.

As shown in FIG. 30(b), the heat-sensitive tape 201 has a five-layer structure. In order from the inner side toward the outer side, the five layers include a cover film 201a formed of polyethylene terephthalate (PET) or the like having a heat-sensitive recording layer formed on the surface thereof, a bonding adhesive layer 201b formed of a suitable adhesive, a plurality of antenna base materials 201c configured of sheet-like pieces having a substantially uniform thickness, an affixing adhesive layer 201d formed of a suitable adhesive, and a release layer (peeling paper) 201e. Each of the antenna base materials 201c has the RFID circuit element To.

Each antenna base material 201c is bonded to the outer surface of the cover film 201a (right side in FIG. 30) by the bonding adhesive layer 201b. Further, the release layer 201e is bonded to the outer surfaces of the antenna base materials 201c by the affixing adhesive layer 201d. The RFID circuit elements To provided in the antenna base materials 201c are substantially flush with the inner surfaces of the antenna base materials 201c. Each RFID circuit element To includes the IC chip 151 and the loop antenna 152 connected to the IC chip 151.

When the cartridge 207 is mounted in the cartridge holder 6 and the roller holder 25 is moved from the release position to the printing position, the heat-sensitive tape 201 is pinched between the print head 23 and the platen roller 26 and between a tape feeding roller 227A and a pressure roller 228. Then, the tape feeding roller 227A, the pressure roller 228, and the platen roller 26 rotate simultaneously so that the heat-sensitive tape 201 is paid out from the first roll 202.

A substantially cylindrical reel 92 is rotatably fitted onto a reel boss 91 erected from the bottom surface of the cartridge 207. The heat-sensitive tape 201 drawn off the first roll 202 is guided by the reel 92 and supplied through an opening 94 to the print head 23 positioned downstream therefrom in the tape conveying direction DS. The printing drive circuit 120 described above (see FIG. 15) supplies electricity to the plurality of heating elements in the print head 23. As a result, the print head 23 prints the label image R on the surface of the cover film 201a, creating a printed label tape 109A. The printed label tape 109A is subsequently conveyed out of the cartridge 207 through an outlet 96.

After the printed label tape 109A is conveyed out of the cartridge 207, the label maker 1 accesses (reads data from or writes data to) the IC chip 151 through the loop antenna LC. Subsequent operations including conveying the printed label tape 109A with the drive roller 51 and cutting the printed label tape 109A with the cutting mechanism 15 are identical to those described in the first embodiment and will not be described here.

It should be noted that a half-cut unit used in this modification differs from the half-cut unit 35 described above. Specifically, in the structure of the half-cut unit 35 shown in FIG. 10 and the like of the first embodiment, the receiving base 38 is disposed on the print head 23 side, and the half cutter 34 is disposed on the platen roller 26 side, in order to perform the half-cut processes in the surface of the printed label tape 109 opposite the side having the release layer 101d.

However, the release layer 201e of the heat-sensitive tape 201 is on the opposite side of the release layer 101d of the base tape 101 described above. Therefore, the receiving base 38 and the half cutter 34 must be arranged in opposite positions to perform the half-cut processes in the section of the printed label tape 109A opposite the release layer 201e. Specifically, the half cutter 34 is positioned on the print head 23 side, and the receiving base 38 is positioned on the platen roller 26 side.

Further, in this modification, a cartridge RFID circuit element Tc storing data related to the cartridge 207 is disposed on an outer peripheral wall of the cartridge 207 so that the label maker 1 can automatically detect data related to the type of cartridge 207 and the like. The cartridge holder 6 also has a side wall portion 6A opposing the RFID circuit element Tc, and an antenna AT is provided on the side wall portion 6A for wirelessly exchanging signals with the RFID circuit element Tc.

Figure 31:
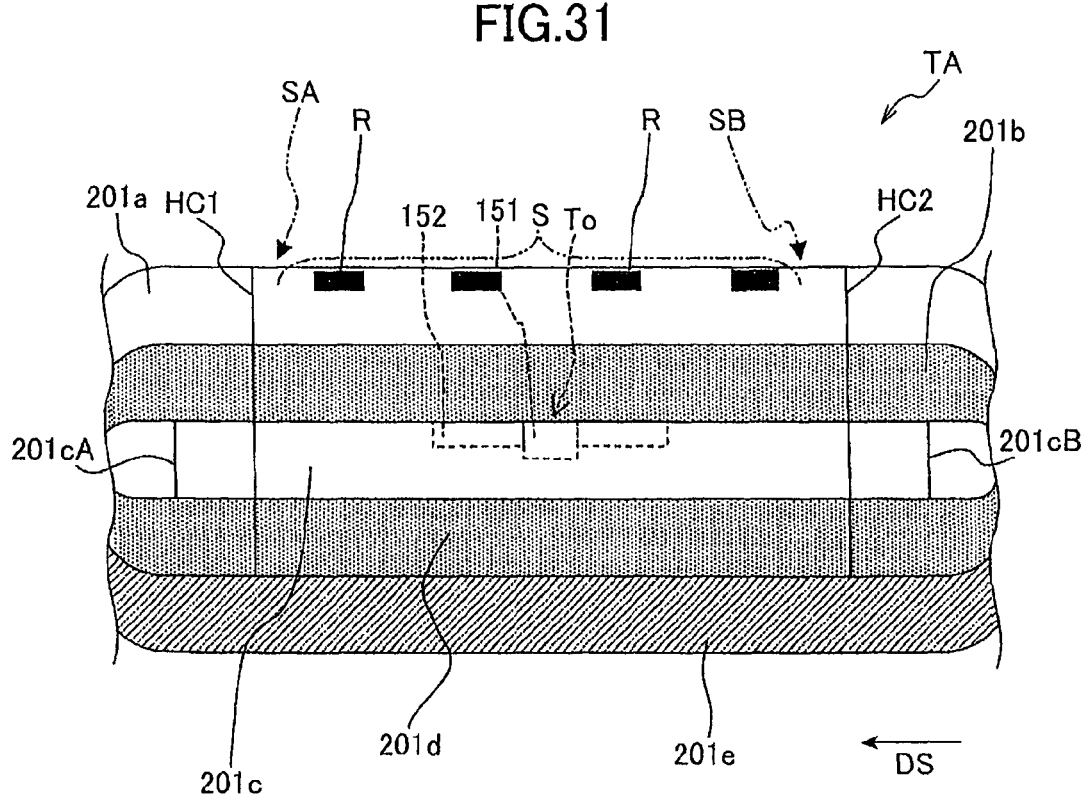
FIG. 31 is a vertical cross-sectional view showing a RFID label formed according to the second embodiment of the disclosure.

FIG. 31 is a vertical cross-sectional view of a RFID label TA formed using the heat-sensitive tape 201 by the label maker 1 equipped with the cartridge 207.

As shown in FIG. 31, the label image R is formed on the top surface of the cover film 201a by generating heat with the print head 23. In this embodiment, the length of the antenna base material 201c (left-to-right dimension in FIG. 31) is set at least as long as the printing region S (longer in the example shown in FIG. 31). Hence, it is possible to set positions of longitudinal ends 201cA and 201cB of the antenna base material 201c equal to or farther outside of the longitudinal edges SA and SB of the printing region S. As a result, regions in which wrinkles are produced can be positioned along the longitudinal edges SA and SB of the printing region S or farther outside. Accordingly, it is possible to prevent a distortion of the label image R printed in the printing region S caused by such wrinkling, thereby improving readability of the label image R.

Since the heat-sensitive tape 201 is used in this embodiment, printing is performed simply by generating heat in the print head 23 and does not require the use of the ink ribbon 15, the ribbon supply roll 107, and the ribbon take-up roller 106. However, printing may be performed using the ink ribbon 15, as described in the first embodiment. In this case also, the same effects can be achieved.

Third Embodiment

Next, a third embodiment of the disclosure will be described with reference to FIGS. 32(a) to 37(d).

Figures 32A, 32B:
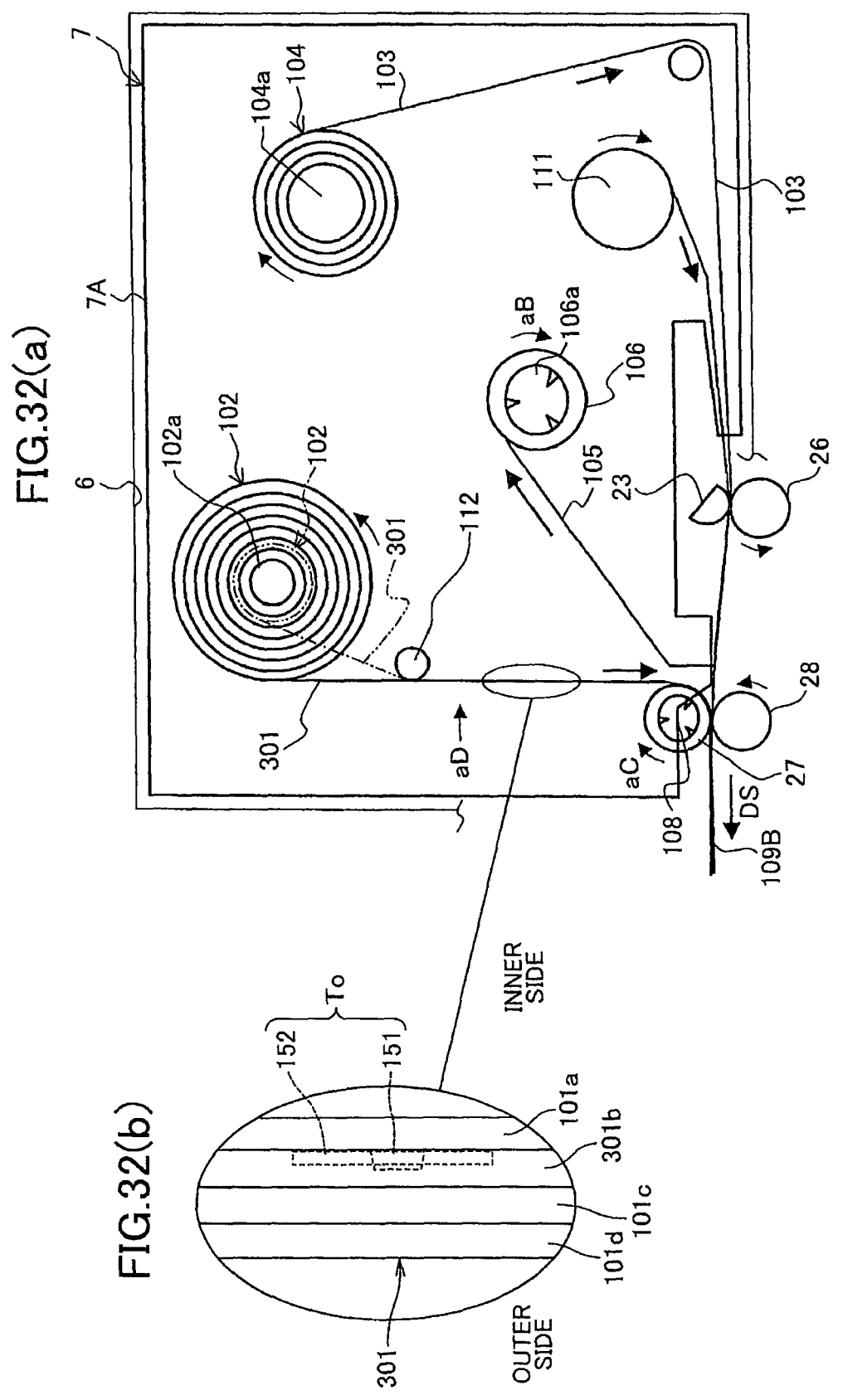

The third embodiment is similar to the above-described first embodiment, but differs in that, as shown in FIG. 32(a), a base tape 301 is used instead of the base tape 101.

As shown in FIG. 32(b), the base tape 301 has a four-layer structure formed by sequentially laminating, from the inner side to the outer side, the adhesive layer 101a, an antenna base material 301b having a substantially uniform thickness, the adhesive layer 101c, and the release layer 101d, in this order.

Figure 33:
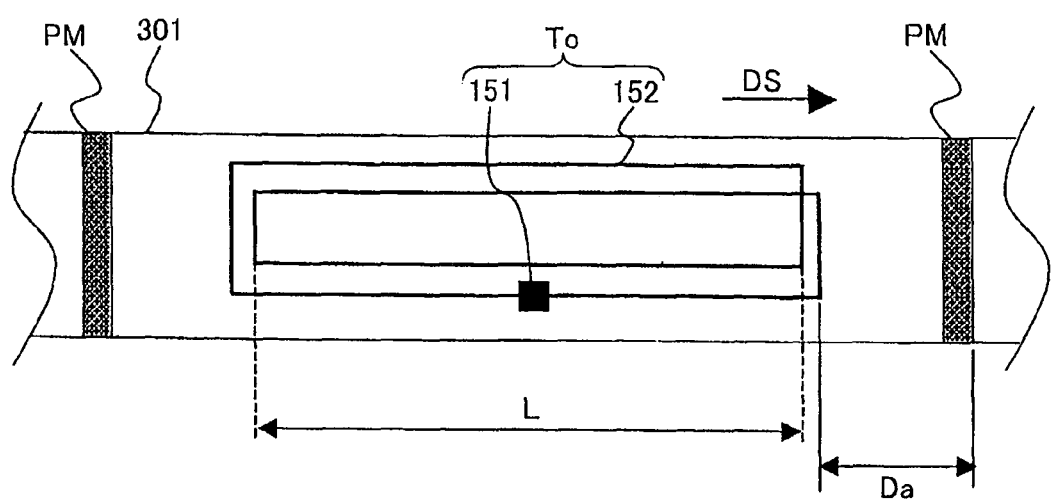
FIG. 33 is a conceptual view of the base tape from the perspective indicated by an arrow aD in FIG. 32(a), showing the general structure of a RFID circuit element provided in the base tape.

A plurality of RFID circuit elements To are embedded in the inner surface of the antenna base material 301b facing the adhesive layer 101a. These RFID circuit elements To are arranged at prescribed intervals in the longitudinal direction of the antenna base material 301b. Each RFID circuit element To includes the IC chip 151 and the loop antenna 152. As shown in FIG. 33, the loop antenna 152 has a length L.

The sensor mark PM is provided on the base tape 301 at a position separated a distance Da from the leading edge of the loop antenna 152 with respect to the tape conveying direction DS. In this embodiment, the distance Da from the sensor mark PM to the loop antenna 152 may be set greater than a distance Db (see FIG. 4) between the print head 23 and the mark sensor 127. With this positional relationship, the area of the cover film 103 to be opposed by the loop antenna 152 has not yet arrived in front of the print head 23 when the sensor mark PM is brought into confrontation with the mark sensor 127 (in other words, when a print start point on the base tape 301 faces the print head 23). With this configuration, as shown in FIG. 36, the printing region S on the cover film 103 is positioned farther upstream in the tape conveying direction DS than the leading edge 152b of the loop antenna 152 when the cover film 103 is bonded to the base tape 301 to produce a printed label tape 109B.

Figure 34A:
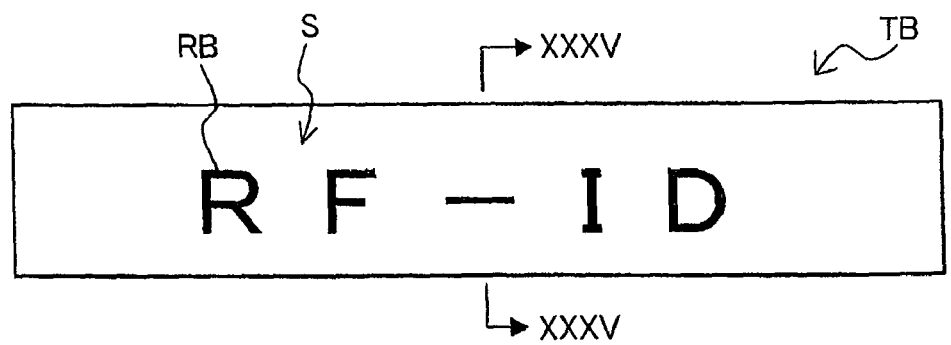
FIG. 34(a) is a plan view illustrating an example of a RFID label formed by a label maker according to the third embodiment of the disclosure.
Figure 34B:
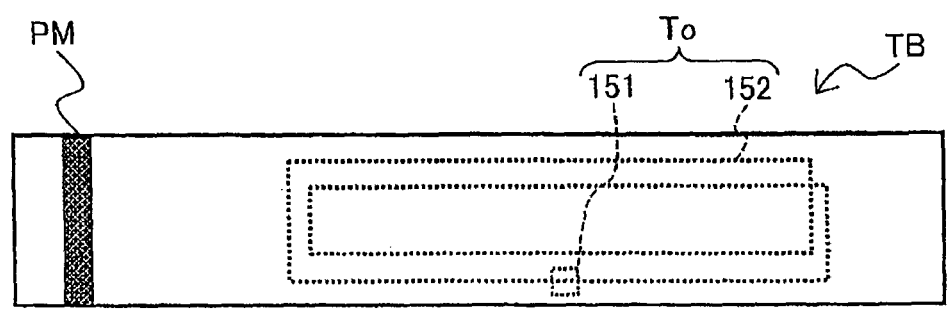
FIG. 34(b) is a bottom view of the RFID label in FIG. 34(a)
Figure 35:
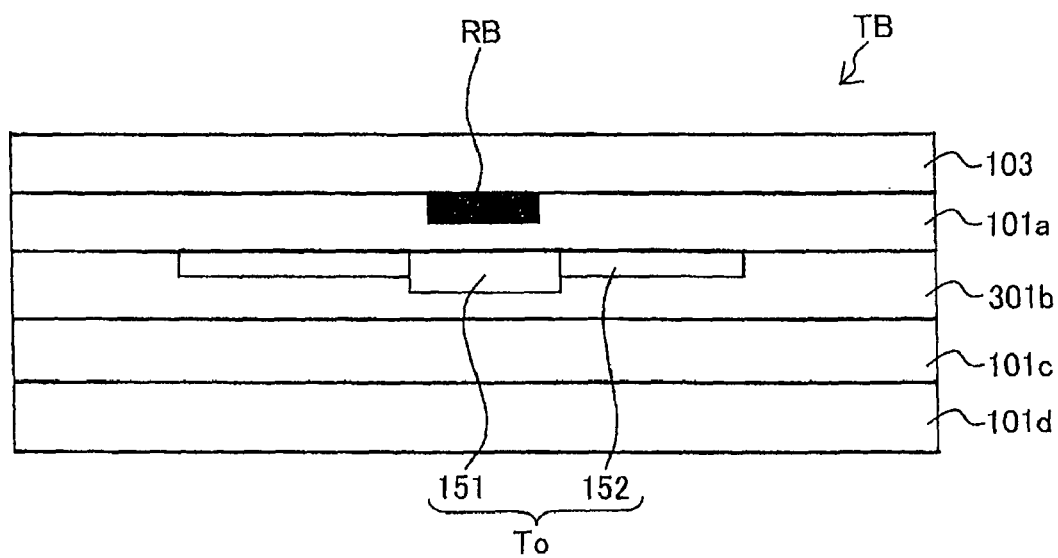
FIG. 35 is a cross-sectional view taken along the line XXXV-XXXV in FIG. 34(a)

FIGS. 34(a) and 34(b) illustrate an example of a RFID label TB formed by the label maker 1 of the third embodiment after writing data to (or reading data from) the RFID circuit element To, printing a label image RB, and cutting the printed label tape 109B, where FIG. 34(a) is a plan view, and FIG. 34(b) is a bottom view. FIG. 35 is a cross-sectional view taken along the line XXXV-XXXV in FIG. 34(a).

As described above, in the conventional laminated structure disclosed in US2006/0118229, the unevenness in the thickness direction occurs near the edges of the circuit elements. Similarly, the unevenness occurs in the base tape 101 of the above-described first embodiment near the edges 101bA, 101bB of the antenna base materials 101b. However, according to the third embodiment, the antenna base material 301b is configured in a tape shape with a substantially uniform thickness, and the RFID circuit elements To are embedded in the antenna base material 101b. Therefore, it is possible to achieve a substantially uniform thickness dimension in the overall layered structure, thereby eliminating (preventing the occurrence of) such unevenness in the tag tape TB. Since this structure can prevent wrinkles from being produced, it is possible to prevent distortion in the label image RB within the print region S printed in mirror image on the side of the cover film 103 bonded to the adhesive layer 101a (underside surface), thereby improving readability. Further, the stiffness of the overall RFID label TB (or first roll 102) is made more uniform along the longitudinal direction.

Figure 37A:
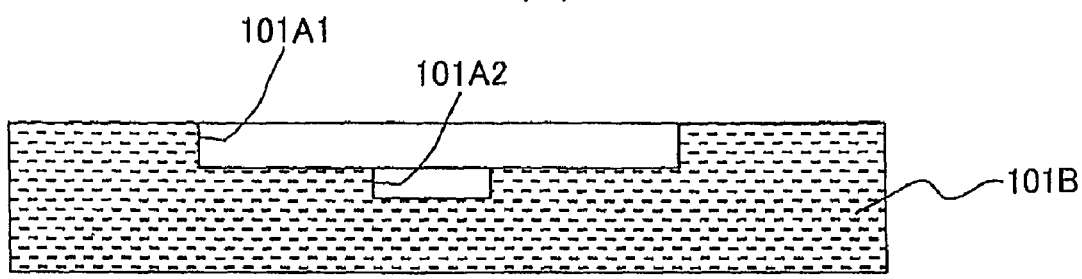
FIG. 37(a) is a cross-sectional view of a base material of the antenna base material of the base tape, etched to form recessed parts.

Next, a method of creating the antenna base material 301b will be described with reference to FIGS. 37(a) to 37(b).

First, a resin tape 101B, which is the base material of the antenna base material 301b, is etched a plurality of times. Specifically, the surface of the resin tape 101B on the side of the adhesive layer 101a is exposed through a mask, and the exposed part or non-exposed parts are etched, depending on whether the resin constituting the antenna base material 301b is a light-curable or photodegradable resin. Through this process, a recessed part 101A1 for the loop antenna 152 is formed in the surface of the resin tape 101B, and a recessed part 101A2 for the IC chip 151 is formed in the recessed part 101A1 (FIG. 37(a)).

Figure 37B:
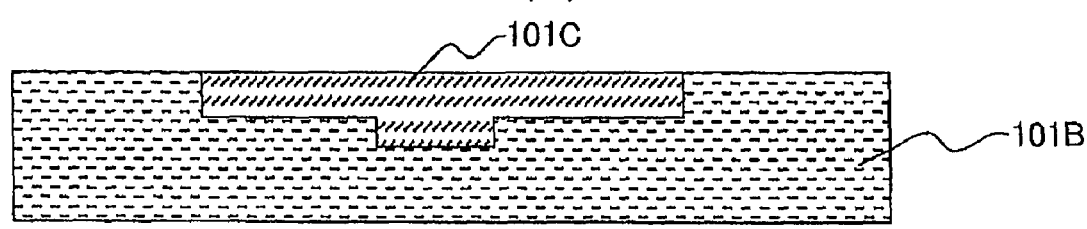
FIG. 37(b) is a cross-sectional view of the base material of FIG. 37(a) with conducting metal layer formed in the recessed parts.

Next, a conducting metal layer 101C of aluminum or other metal is formed on the recessed part 101A1 and the recessed part 101A2 through vapor deposition, sputtering, or another suitable deposition method (FIG. 37(b)).

Figure 37C:
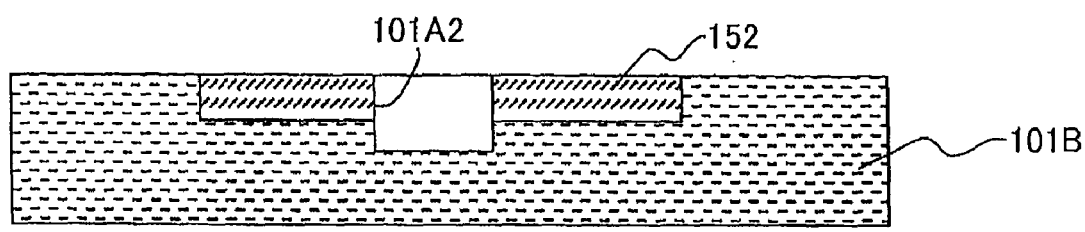
FIG. 37(c) is a cross-sectional view of the base material of FIG. 37(b) formed with a recessed part in the conducting metal layer.

Subsequently, etching is performed on the conducting metal layer 101C multiple times using a mask to open the recessed part 101A2 for the IC chip 151 up to the surface of the conducting metal layer 10C, leaving a loop-shaped part in the remaining region of the conducting metal layer 101C, thereby producing the loop antenna 152 (FIG. 37(c)).

Figure 37D:
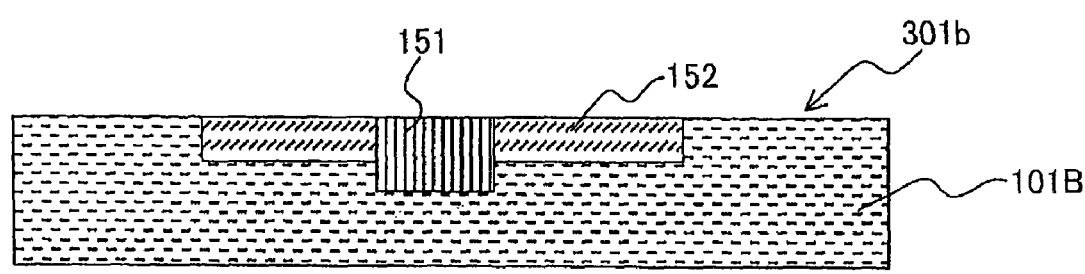
FIG. 37(d) is a cross-sectional view of the antenna base material.

Finally, the IC chip 151 is inserted into the recessed part 101A2 and electrically connected to the loop antenna 152 with silver solder or another conducting paste to form the antenna base material 301b (FIG. 37(d)).

In this method, when the recessed part 101A2 for inserting the IC chip 151 is formed by etching, the loop antenna 152 can be produced as described above. That is, the loop antenna 152 can be formed using the same etching technology used to form the IC chip 151.

As described above, according to the third embodiment, the loop antenna 152 can be embedded in the surface of the antenna base material 301b using a relatively easy and reliable method in which the loop antenna 152 and the IC chip 151 are substantially flush with the surface of the antenna base material 301b on the side opposing the adhesive layer 101a. Accordingly, the overall layered structure can be formed with a substantially uniform thickness, thereby reliably preventing the occurrence of wrinkles.

It should be noted that the above-described antenna base materials 101b and 201c of the first and second embodiments can also be produced in the same manner.

First Modification of the Third Embodiment

In the above-described third embodiment, the width dimension orthogonal to the longitudinal direction is identical for each of the five layers constituting the RFID label TB, including the cover film 103, the adhesive layer 101*a*, the antenna base material 301*b*, the adhesive layer 101*c*, and the release layer 101*d*. However, the widths of these layers do not necessarily have to be the same.

Figure 38:
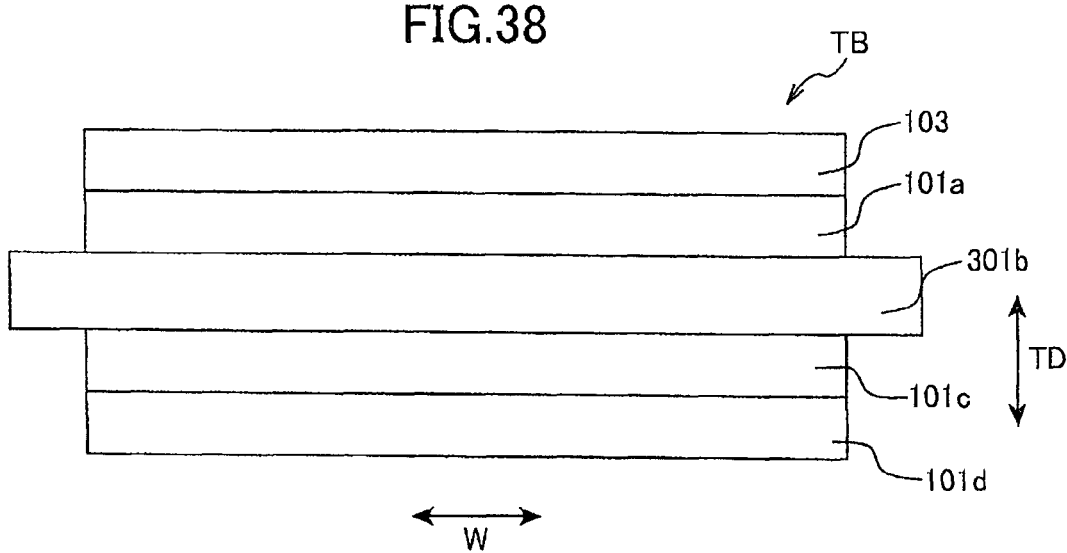
FIG. 38 is an explanatory diagram conceptually illustrating a cross section of a RFID label according to a first modification of the third embodiment of the disclosure in which the widths of layers have been changed.

That is, as shown in FIG. 38, the dimension of the antenna base material 131*b* in the width direction W may be greater than the width dimension of the adhesive layers 101*a* and 101*c*. In this modification, the width dimensions of the cover film 103 and the release layer 101*d* are set identical to that of the adhesive layers 101*a* and 101*c*.

By setting the width dimension of the antenna base material 301*b* greater than that of the adhesive layers 101*a* and 101*c* provided on either side in the thickness direction TD, this structure reliably prevents contact or adhesion between the adhesive layers 101*a* and 101*c* that could occur if the adhesive layers 101*a* and 101*c* extend beyond the widthwise edges of the antenna base material 301*b*.

Second Modification of the Third Embodiment

Figure 39:
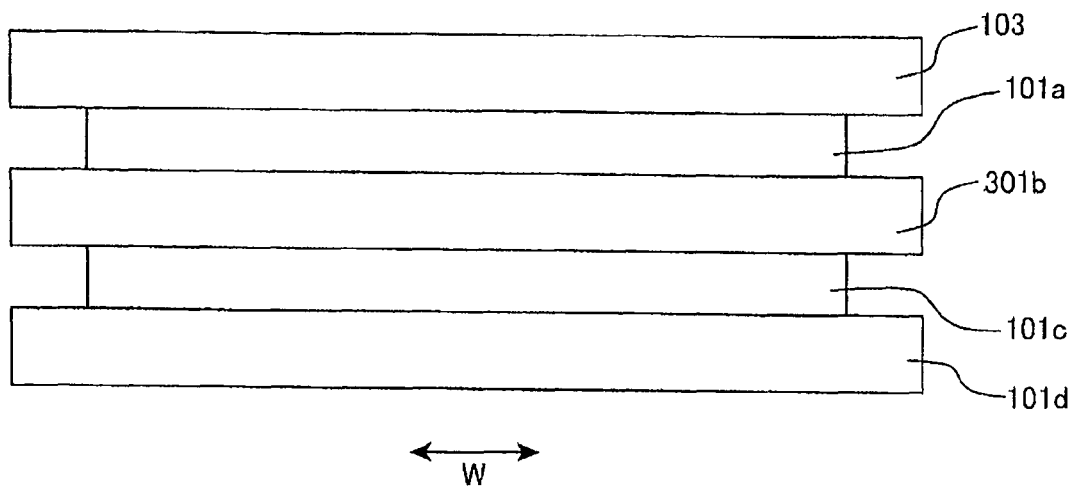
FIG. 39 is an explanatory diagram conceptually illustrating a cross section of a RFID label according to a second modification of the third embodiment of the disclosure in which the widths of layers have been changed.

Alternatively, as shown in FIG. 39, the width dimension of the cover film 103 may be larger than the width dimensions of the adhesive layers 101*a* and 101*c*. In this modification, the width dimensions of the antenna base material 101*b* and the release layer 101*d* are identical to that of the cover film 103. As a result, the width dimension of the release layer 101*d* is greater than that of the adhesive layers 101*a* and 101*c*.

By setting the width dimension of the cover film 103 greater than the width dimensions of the adhesive layers 101*c* and 101*a*, this structure can reliably prevent a drop in the ease of handling the RFID label TB that might occur if adhesive material in the adhesive layers 101*a* and 101*c* were to bond with the edges of the cover film 103.

Further, by setting the width dimension of the release layer 101*d* greater than the width dimensions of the adhesive layers 101*a* and 101*c*, this structure can reliably prevent a drop in the ease of handling the RFID label TB that might occur if the adhesive material in the adhesive layers 101*a* and 101*c* were to extend and bond with the edges of the release layer 101*d*.

Third Modification of the Third Embodiment

It is also possible to set any one of all three components including the cover film 103, the antenna base material 301*b*, and the release layer 101*d* at a larger width dimension than that of the adhesive layer 101*a* and the adhesive layer 101*c*. In this case also, the same effect as in the above-described first or second modification can be achieved.

Fourth Modification of the Third Embodiment

While the sensor mark PM is provided on the surface of the release layer 101*d* in the third embodiment, the sensor mark PM may be provided on a layer other than the release layer 101*d*, provided that the mark sensor 127 can detect the sensor mark PM.

For example, as shown in FIG. 40, the sensor mark PM may be provided on the surface of the antenna base material 301*b* facing the adhesive layer 101*c*, rather than on the release layer 101*d*. In addition, the adhesive layer 101*c* and the release layer 101*d* are formed of a permeable material, such as a material of a transparent color, so that the mark sensor 127 can detect the sensor mark PM from the release layer 101*d* side.

With this construction, both the RFID circuit element To and the sensor mark PM are provided on the tape-shaped antenna base material 301*b* formed of a common material. Accordingly, this configuration facilitates the precise positioning of the RFID circuit element To and the sensor mark PM when manufacturing the base tape 301.

Fourth Embodiment

Next, a fourth embodiment of the disclosure will be described with reference to FIGS. 41(*a*) to 42.

The fourth embodiment is similar to the above-described second embodiment, but differs in that, as shown in FIG. 41(*a*), a heat-sensitive tape 401 is used instead of the heat-sensitive tape 201 shown in FIG. 30.

As shown in FIG. 41(*b*), the heat-sensitive tape 401 has a five-layer structure. In order from the inner side toward the outer side, the five layers include the cover film 201*a*, the bonding adhesive layer 201*b*, an antenna base material 401*c*, the affixing adhesive layer 201*d*, and the release layer 201*e*. The antenna base material 401*c* has the same configuration as the above-described antenna base material 301*b* shown in FIG. 32(*b*).

In this embodiment also, the antenna base material 401*c* is configured in a tape shape with a substantially uniform thickness, and the RFID circuit elements To are embedded in the surface of the antenna base material 401*c*. Accordingly, uneven areas are not produced in the heat-sensitive tape 401, thereby achieving an overall layered structure having a substantially uniform thickness. Since this structure can prevent wrinkles from being produced in the heat-sensitive tape 401, it is possible to prevent distortion in a printed image that is printed in a normal orientation on the surface of the cover film 201*a*, thereby improving readability. Further, the stiffness of the overall RFID label (first roll 202) is more uniform along the longitudinal direction.

While the disclosure has been described in detail with reference to specific embodiments thereof, it would be apparent to those skilled in the art that many modifications and variations may be made therein without departing from the spirit of the disclosure, the scope of which is defined by the attached claims.

In the embodiments described above, data transmission and reception is achieved through magnetic induction (including electromagnetic induction, magnetic coupling, or any other noncontact method utilizing an electromagnetic field) using the loop antenna LC on the label maker 1 side and the loop antenna 152 of the RFID circuit element To. However, data transmission and reception may be achieved through radio waves using a dipole antenna, patch antenna, or other communicating means for these two antennas.

Further, after printing and accessing (reading/writing) the RFID circuit element To in the printed label tape 109 (109A, 109B, 109C), as described above, the cutting mechanism 15 cuts the printed label tape 109 to form the RFID label T (TA, TB). However, the disclosure may also be applied to other configurations, such as a tape roll provided with consecutive pre-separated labels (die-cut labels) of a desired label size mounted on a tape. In this case, the labels are not cut with the cutting mechanism 15; rather the label having a RFID circuit element To that has been accessed and printed with a corresponding image may be peeled from the tape after the tape is discharged through the label outlet 11 to obtain the RFID label T.

Further, in the above embodiments, the first roll 102 (202) is configured of the base tape 101 (202, 301, 401) wound about the reel member 102a (202a), and is disposed in the cartridge 7 (207) with the base tape 101 being paid out therefrom. However, it is also possible to form a cartridge having long sheets or short strip-like tape or sheets (including a roll of tape that is paid out and cut to suitable lengths), each of which is provided with at least one RFID circuit element To, stacked in a prescribed accommodating section (such as sheets stacked in a tray). The cartridge is mounted in a cartridge holder in the label maker, and labels are formed by feeding the stacked sheets from the accommodating section and conveying the sheets in the label maker to be printed and written to.

It is also possible to have a configuration in which the first roll is detachably mounted directly in the label maker or a configuration provided with a prescribed feeding mechanism to feed the long sheets or short strip-like tape or sheets into the label maker one at a time. Further, rather than detachably mounting the cartridge in the label maker as described above, the first roll may be fixed in or integrally configured with the body of the label maker so as not to be detachable. Any of these configurations can achieve the same effects as described above.

In the above embodiments, the cartridge type is detected by the cartridge sensor 134, and the dimension of the printing region S is regulated based on the detected cartridge type. However, the dimension of the printing region S may be regulated based on data indicating the layout of the antenna base material that is stored in the ROM 116 for each cartridge type.

Further, any suitable combination of the methods according to the embodiments or the modifications thereof, which have not been described herein, may also be used.

The invention claimed is:

1. A tag tape roll comprising:
   a shaft extending in a first direction; and
   a tag tape wound about the shaft, the tag tape extending in a second direction substantially orthogonal to the first direction and including:
      a plurality of sheet-like antenna base materials arranged at prescribed intervals along the second direction, each antenna base material having a RFID circuit element that includes an IC chip and an antenna;
      an affixing adhesive layer that is disposed on the antenna base materials and that enables to fix each of the antenna base materials to an object;
      a release layer that covers the affixing adhesive layer and that is peeled off when fixing any of the antenna base materials to the object; and
      a bonding adhesive layer that enables the antenna base materials to be bonded to a printable tape layer having a plurality of printing regions in correspondence with the RFID circuit elements, each of the printing regions being sandwiched between a pair of non-printing regions, wherein an image is to be printed within each of the printing regions;
   wherein a length of each antenna base material is equal to or greater than a length of a corresponding printing region with respect to the second direction, and is shorter than a length of a region including the corresponding printing region and the pair of non-printing regions sandwiching the corresponding printing region with respect to the second direction of the tag tape.

2. The tag tape roll according to claim 1, wherein the tag tape further includes the printable tape layer.

3. RFID circuit element cartridge that is detachably mountable on a tag label maker, the RFID circuit element cartridge comprising:
   a tag tape roll that includes a roll of tag tape having:
      a plurality of sheet-like antenna base materials arranged at prescribed intervals along a longitudinal direction of the tag tape, each antenna base material having a RFID circuit element that includes an IC chip and an antenna;
      an affixing adhesive layer that is disposed on the antenna base materials and that enables to fix each of the antenna base materials to an object;
      a release layer that covers the affixing adhesive layer and that is peeled off when fixing any of the antenna base materials to the object; and
      a bonding adhesive layer that enables the antenna base materials to be bonded to a printable tape layer having a plurality of printing regions in correspondence with the RFID circuit elements, each of the printing regions being sandwiched between a pair of non-printing regions, wherein an image is to be printed within each of the printing regions;
   wherein a length of each antenna base material is equal to or greater than a length of a corresponding printing region with respect to the longitudinal direction of the tag tape, and is shorter than a length of a region including the corresponding printing region and the pair of non-printing regions sandwiching the corresponding printing region with respect to the longitudinal direction of the tag tape.

4. The RFID circuit element cartridge according to claim 3, further comprising a printable tape roll that includes a roll of the printable tape layer.

5. The RFID circuit element cartridge according to claim 3, wherein the tag tape further has the printable tape layer that is bonded to the antenna base materials by the bonding adhesive layer.

* * * * *